United States Patent
Garault et al.

(10) Patent No.: US 12,545,887 B2
(45) Date of Patent: Feb. 10, 2026

(54) **SUCROSE NEGATIVE *STREPTOCOCCUS THERMOPHILUS* FOR USE IN PREPARATION OF FERMENTED PRODUCTS**

(71) Applicant: Compagnie Gervais Danone, Paris (FR)

(72) Inventors: Peggy Garault, Saclay (FR); Jean-Michel Faurie, Jouy-en-Josas (FR); Gaëlle Quere, Montlhery (FR)

(73) Assignee: Compagnie Gervais Danone, Paris (FR)

( * ) Notice: Subject to any disclaimer, the term of this patent is extended or adjusted under 35 U.S.C. 154(b) by 781 days.

(21) Appl. No.: 17/758,150

(22) PCT Filed: Dec. 30, 2020

(86) PCT No.: PCT/EP2020/088014
§ 371 (c)(1),
(2) Date: Jun. 29, 2022

(87) PCT Pub. No.: WO2021/136799
PCT Pub. Date: Jul. 8, 2021

(65) Prior Publication Data
US 2023/0038154 A1 Feb. 9, 2023

(30) Foreign Application Priority Data
Dec. 30, 2019 (EP) .................................... 19306785

(51) Int. Cl.
*C12N 1/20* (2006.01)
*A23C 9/123* (2006.01)

(52) U.S. Cl.
CPC ............ *C12N 1/205* (2021.05); *A23C 9/1238* (2013.01); *A23C 2220/202* (2013.01); *A23C 2260/05* (2013.01); *A23V 2400/249* (2023.08)

(58) Field of Classification Search
CPC . C12N 1/205; A23C 9/1238; A23C 2220/202; A23C 2260/05; A23C 2220/206; A23V 2400/249; A23V 2002/00; A23V 2400/24
See application file for complete search history.

(56) References Cited

U.S. PATENT DOCUMENTS

2007/0292561 A1   12/2007   Garault et al.

FOREIGN PATENT DOCUMENTS

| CA | 2304985 A1 | 4/1999 | |
|---|---|---|---|
| EP | 2529035 A1 | 12/2012 | |
| EP | 2957180 A1 * | 12/2015 | ............. A23C 9/123 |
| JP | 5144186 B2 | 2/2013 | |
| WO | 2011/092300 A1 | 8/2011 | |
| WO | 2017103051 A1 | 6/2017 | |
| WO | 2018177835 A1 | 10/2018 | |
| WO | 2019/043115 A1 | 3/2019 | |
| WO | 2019122365 A1 | 6/2019 | |

OTHER PUBLICATIONS

Robitaille et al, "Fat-free yogurt made using a galactose-positive exopolysaccharide-producing recombinant strain of *Streptococcus thermophilus*", Feb. 1, 2009, vol. 92, No. 2, p. 477-482.
Anbukkarasi et al, "Preparation of low galactose yogurt using cultures of Gal+*Streptococcus thermophilusin* combination withLactobacillus delbrueckiissp.bulgaricus", Feb. 2, 2014, vol. 51, No. 9, p. 2183-2189.
International Search Report and Written Opinion mailed Mar. 19, 2021 for PCT Application No. PCT/EP2020/088014.
Bogaard et al., "Sugar Utilisation and Conservation of the gal-lac Gene Cluster in *Streptococcus thermophilus*", Systematic and Applied Microbiology, vol. 27, 2004, pp. 10-17.
Clemens et al., "Functionality of Sugars in Foods and Health", Comprehensive Reviews in Food Science and Food Safety, vol. 15, No. 3. 2016, pp. 433-470.
Cui et al., "New advances in exopolysaccharides production of *Streptococcus thermophilus*", Arch. Microbiology, vol. 199, 2017, 11 pages.
Dragosits et al., "Adaptive laboratory evolution—principles and applications for biotechnology", Microbial Cell Factories, vol. 12, No. 64, 2013, pp. 1-17.
Elli et al., "Survival of yogurt bacteria in the human gut", Applied Environmental Microbiology, vol. 72, No. 7, Jul. 2006, pp. 5113-5117.
Erkus et al., "High genetic and phenotypic variability of *Streptococcus thermophilus* strains isolated from artisanal Yuruk yoghurts", LWT—Food Science and Technology, vol. 58, 2014, pp. 348-354.
Galia et al., "Acquisition of PrtS in *Streptococcus thermophilus* is not enough in certain strains to achieve rapid milk acidification", Dairy Science & Technology, vol. 96, 2016, pp. 623-636.
Garault et al., "Branched-Chain Amino Acid Biosynthesis Is Essential for Optimal Growth of *Streptococcus thermophilus* in Milk", Applied and environmental microbiology, vol. 66, No. 12, Dec. 2000, pp. 5128-5133.
Garault, Peggy, "Declaration of Dr Peggy Garault", European patent EP3845069B1, Date Unknown, pp. 1-27.
Letter on Microbial Deposit from CNCM, dated Nov. 19, 2020 (Original Document only).
Herman et al., "Isolation and Partial Characterization of Plasmid DNA from *Streptococcus thermophilus*", Applied and Environmental Microbiology, vol. 50, No. 4, Oct. 1985, pp. 1103-1106.

(Continued)

*Primary Examiner* — Kade Ariani
(74) *Attorney, Agent, or Firm* — ArentFox Schiff LLP

(57) ABSTRACT

The present invention relates to novel sucrose negative (Suc-) *Streptococcus thermophilus* strains, compositions comprising said strains, uses thereof, methods for obtaining such strains and methods for the preparation of fermented food products using such compositions.

20 Claims, 9 Drawing Sheets
Specification includes a Sequence Listing.

(56) References Cited

OTHER PUBLICATIONS

Høier et al., "Chapter 5—The Production, Application and Action of Lactic Cheese Starter Cultures", Technology of Cheesemaking, 2nd edition, Blackwell Publishing Ltd., 2010, pp. 166-192.

Hu et al., "Technological properties assessment and two component systems distribution of *Streptococcus thermophilus* strains isolated from fermented milk", Archives of Microbiology, vol. 200, 2018, 14 pages.

Hurtado-Ortiz, Raquel, "Identification of the microorganism", Budapest treaty on the international recognition of the deposit of microorganisms for the purposes of patent procedure, Feb. 6, 2020, 2 pages (Original Document only).

Johansen et al., "Modern approaches for isolation, selection, and improvement of bacterial strains for fermentation applications", Advances in Fermented Foods and Beverages, Woodhead Publishing, 2015, pp. 227-248.

Johansen et al., "Use of Natural Selection and Evolution to Develop New Starter Cultures for Fermented Foods", Annual Review of Food Science and Technology, vol. 9, 2018, pp. 411-428.

Jones et al., "Integration of image analysis and robotics into a fully automated colony picking and plate handling system", Nucleic Acids Research, vol. 20, No. 17, 1992, pp. 4599-4606.

Low et al., "Role of *Streptococcus thermophilus* MR-1C Capsular Exopolysaccharide in Cheese Moisture Retention", Applied and environmental microbiology, vol. 64, No. 6, Jun. 1998, pp. 2147-2151.

Martinez et al., "Lactic acid properties, applications and production: A review", Trends in Food Science & Technology, vol. 30, 2013, pp. 70-83.

Martinovic et al., "*Streptococcus thermophilus*: To Survive, or Not to Survive the Gastrointestinal Tract, That Is the Question!", Nutrients, vol. 12, Article No. 2175, 2020, pp. 1-12.

Mitchell et al., "Associative Growth and Differential Enumeration of *Streptococcus thermophilus* and Lactobacillus bulgaricus: A Review", Journal of Food Protection, vol. 47, No. 3, Mar. 1984, pp. 245-248.

Occhino et al., "A Comparison of Beta-Galactosidase Specific Activities in Strains of *Streptococcus thermophilus*", Journal of Dairy Science, vol. 69, 1986, pp. 2583-2588.

Proust et al., "Complete Genome Sequence of the Industrial Fast-Acidifying Strain *Streptococcus thermophilus* N4L", Genome Sequences, vol. 7, Issue 8, e01029-18, 2018, pp. 1-2.

Somkuti et al., "Adaptability of *Streptococcus thermophilus* to Lactose, Glucose and Galactose", Journal of Food Protection, vol. 42, No. 11, Nov. 1979, pp. 885-887.

Somkuti et al., "β-Fructofuranosidase activity in disaccharide transport mutants of *Streptococcus thermophilus*", Biotechnology Letters, vol. 13, No. 11, 1991, pp. 809-814.

Unknown, "Annotated simple Espacenet family of D10 (WO2011092300A1)", Espacenet, Downloaded on Oct. 13, 2023, pp. 1-2.

Unknown, "Annotated simple Espacenet family of D5 (WO2017103051A1)", Espacenet, Downloaded on Oct. 13, 2023, 1 page.

Unknown, "Annotated simple Espacenet family of D6 (WO2019122365A1)", Espacenet, Downloaded on Oct. 13, 2023, 1 page.

Unknown, "Annotated simple Espacenet family of D7 (WO2018177835A1)", Espacenet, Downloaded on Oct. 13, 2023, 1 page.

Unknown, "NCIMB 701968", NCIMB, Downloaded on Oct. 17, 2024, 1 page.

Unknown, "Part I: General requirements for deposit and furnishing of samples", WIPO, Available on internet at <https://www.wipo.int/documents/d/budapest-system/docs-en-guide-part_i.pdf>, Date Unknown, pp. 1-30.

Unknown, "print out of exchanges between the Patentee and NCIMB culture collection", Outlook, 2024, 6 pages.

Unknown, "prok_in_catalog", Print out of NRRL online catalogue, downloaded on Nov. 6, 2024, pp. 1-462.

Unknown, "Screening Robotics and Automation", Product Focus, Journal of Biomolecular Screening, vol. 12, No. 8, 2007, pp. 1120-1125.

Unknown, "*Streptococcus thermophilus* Orla-Jensen 19258™", Product Sheet, ATCC, Sep. 17, 2022, pp. 1-5.

Xiong et al., "Genomic and phenotypic analyses of exopolysaccharide biosynthesis in *Streptococcus thermophilus* S-3", Journal of Dairy Science, vol. 102, 2019, pp. 4925-4934.

Zhang et al., "A greedy algorithm for aligning DNA sequences", Journal of Computational Biology, vol. 7, No. 1/2, 2000, pp. 203-214.

Mariela Serrano, "Characterisation of NCIMB 701968," submitted in the Opposition of EP Patent No. 3845069 (Application No. 19306785.7), submitted on Jun. 11, 2025.

Interlocutory Decision in Opposition of EP Patent No. 3845069 (Application No. 19306785.7), mailed Feb. 11, 2025.

\* cited by examiner

*lacS* gene

```
Wt  (SEQ ID NO: 1)     1 ATGGAAAAATCTAAAGGTCAGATGAAGTCTCGTTTATCCTACGCAGCTGGTGCTTTTGGTAACGACGTCT
G15 (SEQ ID NO: 2)     1 .....................................................................

Wt  (SEQ ID NO: 1)    71 TCTATGCAACCTTGTCAACATACTTTATCATGTTTGTGACAACTCACTTGTTTAACACAGGTGATCCAAA
G15 (SEQ ID NO: 2)    71 .....................................................................

Wt  (SEQ ID NO: 1)   141 GCAAAATAGTCACTACGTACTATTAATCACTAACATTATCTCTATTTTGCGTATCTTGGAAGTATTTATC
G15 (SEQ ID NO: 2)   141 .....................................................................

Wt  (SEQ ID NO: 1)   211 GATCCATTGATCGGTAATATGATTGATAACACTAATACTAAGTATGGTAAATTCAAACCATGGGTAGTTG
G15 (SEQ ID NO: 2)   211 .....................................................................

Wt  (SEQ ID NO: 1)   281 GTGGTGGTATCATCAGTTCTATCACCTTGTTGCTTCTCTTCACCGATTTAGGTGGTTTGAATAAAACAAA
G15 (SEQ ID NO: 2)   281 .....................................................................

Wt  (SEQ ID NO: 1)   351 TCCTTTCTTGTACCTTGTACTTTTTGGAATTATCTACCTTGTAATGGATGTCTTCTACTCGATTAAAGAT
G15 (SEQ ID NO: 2)   351 .....................................................................

Wt  (SEQ ID NO: 1)   421 ATCGGTTTCTGGTCAATGATTCCTGCCTTGTCTCTTGATAGTCACGAACGTGAAAAAATGGCAACTTTTG
G15 (SEQ ID NO: 2)   421 .....................................................................

Wt  (SEQ ID NO: 1)   491 CCCGTATTGGTTCTACGATTGGTGCCAATATTGTAGGTGTTGCCATCATGCCAATCGTTTTGTTCTTCTC
G15 (SEQ ID NO: 2)   491 .....................................................................

Wt  (SEQ ID NO: 1)   561 TATGACGAACAATAGTGGCTCTGGAGATAAATCTGGATGGTTCTGGTTTGCATTTATCGTTGCTCTCATT
G15 (SEQ ID NO: 2)   561 .....................................................................

Wt  (SEQ ID NO: 1)   631 GGTGTGATTACATCAATTGCTGTTGGTATTGGTACACGTGAAGTTGAGTCAAAAATTCGTGATAATAACG
G15 (SEQ ID NO: 2)   631 .....................................................................

Wt  (SEQ ID NO: 1)   701 AAAAAACTAGCCTTAAACAAGTCTTTAAGGTTCTTGGTCAAAACGACCAATTGATGTGGTTATCTCTTGG
G15 (SEQ ID NO: 2)   701 .....................................................................

Wt  (SEQ ID NO: 1)   771 ATATTGGTTCTATGGTCTTGGTATTAATACACTTAATACTCTTCAACTTTATTATTTCACATTTATCCTT
G15 (SEQ ID NO: 2)   771 .....................................................................

Wt  (SEQ ID NO: 1)   841 GGTGATTCAGGTAAATACTCAATTCTTTACGGATTGAATACAGTTGTTGGTTTGGTTTCAGTTTCACTCT
G15 (SEQ ID NO: 2)   841 .....................................................................

Wt  (SEQ ID NO: 1)   911 TCCCTACCCTAGCTGATAAATTCAACCGTAAACGTTTGTTCTACGGATGTATTGCAGTAATGCTCGGGGG
G15 (SEQ ID NO: 2)   911 .....................................................................

Wt  (SEQ ID NO: 1)   981 TATCGGAATATTTAGTATTGCAGGTACATCACTTCCAATAATCTTGACTGCAGCTGAACTCTTCTTCATT
G15 (SEQ ID NO: 2)   981 .....................................................................

Wt  (SEQ ID NO: 1)  1051 CCACAACCTCTTGTGTTCCTTGTTGTCTTTATGATTATCTCTGACTCAGTAGAATATGGTCAATGGAAAA
G15 (SEQ ID NO: 2)  1051 .....................................................................

Wt  (SEQ ID NO: 1)  1121 CGGGACACCGTGATGAATCACTTACTTTGTCAGTTCGT[C]CACTTATTGATAAACTTGGTGGTGCGATGTC
G15 (SEQ ID NO: 2)  1121 .......................................[A].........................

Wt  (SEQ ID NO: 1)  1191 AAACTGGCTTGTTTCTACATTTGCCATAGCTGCCGGTATGACAACAGGTGCCTCAGCATCAACAATTACA
G15 (SEQ ID NO: 2)  1191 .....................................................................

Wt  (SEQ ID NO: 1)  1261 ACACATCAACAGTTTATCTTTAAGCTTGGCATGTTTGCTTTCCCAGCAGCAACAATGCTTATCGGTGCCT
G15 (SEQ ID NO: 2)  1261 .....................................................................

Wt  (SEQ ID NO: 1)  1331 TCATTGTTGCTCGTAAAATCACTTTGACTGAAGCACGTCACGCTAAAATTGTTGAAGAATTGGAACATCG
G15 (SEQ ID NO: 2)  1331 .....................................................................

Wt  (SEQ ID NO: 1)  1401 CTTTAGCGTAGCAACTTCTGAAAATGAAGTTAAAGCTAACGTCGTATCTCTTGTAACCCCTACAACTGGT
G15 (SEQ ID NO: 2)  1401 .....................................................................

Wt  (SEQ ID NO: 1)  1471 TATTTGGTTGATCTCTCAAGTGTTAATGATGAACACTTTGCTTCAGGTAGCATGGGTAAAGGTTTCGCCA
G15 (SEQ ID NO: 2)  1471 .....................................................................
```

FIGURE 7A

```
Wt  (SEQ ID NO: 1) 1541 TTAAACCTACTGATGGAGCTGTCTTTGCACCAATTAGTGGTACCATTCGTCAAATTCTTCCTACTCGCCA
G15 (SEQ ID NO: 2) 1541 ......................................................................

Wt  (SEQ ID NO: 1) 1611 TGCAGTTGGTATTGAAAGTGAAGATGGTGTCATTGTTCTTATCCACGTTGGCATCGGAACAGTTAAACTT
G15 (SEQ ID NO: 2) 1611 ......................................................................

Wt  (SEQ ID NO: 1) 1681 AATGGTGAAGGATTCATTAGTTACGTAGAACAAGGTGATCATGTTGAAGTTGGACAAAAACTTCTTGAGT
G15 (SEQ ID NO: 2) 1681 ......................................................................

Wt  (SEQ ID NO: 1) 1751 TCTGGTCACCAATTATTGAGAAAAATGGTCTTGATGACACAGTACTTGTCACTGTAACTAATTCAGAAAA
G15 (SEQ ID NO: 2) 1751 ......................................................................

Wt  (SEQ ID NO: 1) 1821 ATTCAGTGCTTTCCATCTTGAACAAAAAGTTGGAGAAAAGGTAGAAGCTTTGTCTGAAGTTATTACCTTC
G15 (SEQ ID NO: 2) 1821 ......................................................................

Wt  (SEQ ID NO: 1) 1891 AAAAAAGGAGAATAA
G15 (SEQ ID NO: 2) 1891 ...............
```

FIGURE 7A (cont.)

LacS protein

```
Wt  (SEQ ID NO: 3)   1 MEKSKGQMKSRLSYAAGAFGNDVFYATLSTYFIMFVTTHLFNTGDPKQNSHYVLLITNIISILRILEVFI
G15 (SEQ ID NO: 4)   1 ......................................................................

Wt  (SEQ ID NO: 3)  71 DPLIGNMIDNTNTKYGKFKFWVGGGIISSITLLLLFTDLGGLNKTNFFLYLVLFGIIYLVMDVFYSIKD
G15 (SEQ ID NO: 4)  71 ......................................................................

Wt  (SEQ ID NO: 3) 141 IGFWSMIPALSLDSHEREKMATFARIGSTIGANIVGVAIMPIVLFFSMTNNSGSGDKSGWFWFAFIVALI
G15 (SEQ ID NO: 4) 141 ......................................................................

Wt  (SEQ ID NO: 3) 211 GVITSIAVGIGTREVESKIRDNNEKTSLKQVFKVLGQNDQLMWLSLGYWFYGLGINTLNTLQLYYFTFIL
G15 (SEQ ID NO: 4) 211 ......................................................................

Wt  (SEQ ID NO: 3) 281 GDSGKYSILYGLNTVVGLVSVSLFPTLADKFNRKRLFYGCIAVMLGGIGIFSIAGTSLPIILTAAELFFI
G15 (SEQ ID NO: 4) 281 ......................................................................

Wt  (SEQ ID NO: 3) 351 PQPLVFLVVFMIISDSVEYGQWKTGHRDESLTLSVRPLIDKLGGAMSNWLVSTFAIAAGMTTGASASTIT
G15 (SEQ ID NO: 4) 351 ............................H.........................................

Wt  (SEQ ID NO: 3) 421 THQQFIFKLGMFAFPAATMLIGAFIVARKITLTEARHAKIVEELEHRFSVATSENEVKANVVSLVTPTTG
G15 (SEQ ID NO: 4) 421 ......................................................................

Wt  (SEQ ID NO: 3) 491 YLVDLSSVNDEHFASGSMGKGFAIKPTDGAVFAPISGTIRQILPTRHAVGIESEDGVIVLIHVGIGTVKL
G15 (SEQ ID NO: 4) 491 ......................................................................

Wt  (SEQ ID NO: 3) 561 NGEGFISYVEQGDHVEVGQKLLEFWSPIIEKNGLDDTVLVTVTNSEKFSAFHLEQKVGEKVEALSEVITF
G15 (SEQ ID NO: 4) 561 ......................................................................

Wt  (SEQ ID NO: 3) 631 KKGE
G15 (SEQ ID NO: 4) 631 ....
```

FIGURE 7B

Intergenic region between *galR* and *galK*

```
Wt  (SEQ ID NO: 5)    1 TCATCAGCGATAGTTAATATCCGATGTCTAGTATCCTCTGTTACGGAAAGAGTTTCATCTTTATTAAGAA
G15 (SEQ ID NO: 6)    1 ......................................................................
                        <<.................................galR...............................<

Wt  (SEQ ID NO: 5)   71 CACGTGAAACAGTTGAAATAGATACACCTGCTAATTTTGCGATATCTGCTAATGTAGCCATAGTATCCTC
G15 (SEQ ID NO: 6)   71 ......................................................................
                        <............................galR........................<<

Wt  (SEQ ID NO: 5)  141 CTCATATTTCAGTATAACATAACTTTTATTTTTTTACCTATATTTTACTAAAAAAATAGTAAAAATATTG
G15 (SEQ ID NO: 6)  141 ......................................................................

Wt  (SEQ ID NO: 5)  211 ATTTTCCATGTGAAAGGGGTTACGATTTCAGTATAAACAAAAAGAATAAGTGAGATACATCCTATGAATA
G15 (SEQ ID NO: 6)  211 ................T.....................................................
                                                                                        galK >>....>

Wt  (SEQ ID NO: 5)  281 CATCACAGTTAAGAGAAAAG
G15 (SEQ ID NO: 6)  281 ....................
                        >......galK.......>>
```

FIGURE 7C scrA gene

```
G15   (SEQ ID NO: 7)      1 ATGGATTACAAACAAATTGCAAAGAAGTCATCGAAGCCCTCGGTGGACGTGAAAATGTTAACAGTGTTG
Cl.11 (SEQ ID NO: 8)      1 ....................................................................

G15   (SEQ ID NO: 7)     71 CTCACTGTGCGACACGTCTACGTGTTATGGTTAAAGATGAAAACAAAATCAATAAAGAAAAAGCTGAGAA
Cl.11 (SEQ ID NO: 8)     71 ....................................................................

G15   (SEQ ID NO: 7)    141 TATTGAAAAAGTTCAAGGTGCTTTCTTTAACTCAGGTCAATACCAAATGATCTTTGGTACAGGTACTGTT
Cl.11 (SEQ ID NO: 8)    141 ....................................................................

G15   (SEQ ID NO: 7)    211 AACAAGATTTACGACGAAGTCGTTGCTCAAGGTCTTCCAACAGCATCTAAAGACGAACAAAAAGCAGAAG
Cl.11 (SEQ ID NO: 8)    211 ....................................................................

G15   (SEQ ID NO: 7)    281 CTGCTAAACAAGGGAACTGGTTCCAACGTGCCATCCGTTCATTCGGTGACGTTTCGTTCCATTGCTTCC
Cl.11 (SEQ ID NO: 8)    281 ....................................................................

G15   (SEQ ID NO: 7)    351 AGCTATCGTAGCGACTGGTCTTTTCATGGGTATCCGTGGAGCCATCAATAATGATACAGTTCTTGCTCTT
Cl.11 (SEQ ID NO: 8)    351 ....................................................................

G15   (SEQ ID NO: 7)    421 TTTGGTACAACATCTAAAGCCTTCGCTGCTACTGATTTCTACACTTATACAGTTGTATTGACAGATACAG
Cl.11 (SEQ ID NO: 8)    421 ....................................................................

G15   (SEQ ID NO: 7)    491 CCTTTGCCTTCTTCCCAGCCTTGATCTGTTGGTCAGCCTTTAACGTTTTCGGTGGTTCACCACTTCTTGG
Cl.11 (SEQ ID NO: 8)    491 ....................................................................

G15   (SEQ ID NO: 7)    561 TTTGGTTCTTGGTTTGATGATGGTTAACAATGCTCTTCCAAATGCTTGGGATGTTGTATCAGGTGCTGCA
Cl.11 (SEQ ID NO: 8)    561 ....................................................................

G15   (SEQ ID NO: 7)    631 AAACCAATTTACTTCTTTGACTTTATTCCAGTAGTTGGTTACCAAAACTCAGTCCTTCCAGCCTTCTTCG
Cl.11 (SEQ ID NO: 8)    631 ....................................................................

G15   (SEQ ID NO: 7)    701 TAGGTTTGATTGGTGCTAAGTTTGAACAATGGGTTCGTAAATGGGTTCCAGATATTCTTGACCTTCTCTT
Cl.11 (SEQ ID NO: 8)    701 ....................................................................

G15   (SEQ ID NO: 7)    771 GCGTCCACTTGTTGTCTTTGCTGTGATGTCAGCTTTGGCCCTCTTTATCATTGGTCCTGTCTTCCACACA
Cl.11 (SEQ ID NO: 8)    771 ....................................................................

G15   (SEQ ID NO: 7)    841 GTTGAGAGCTACGTACTTGCTGGTACAGAGTGGATTCTTGCCTTGCCATTTGGTCTTGCAGGTCTTGTTC
Cl.11 (SEQ ID NO: 8)    841 ....................................................................

G15   (SEQ ID NO: 7)    911 TAGGTGGTATTCACCAAATTATCGTCGTTACAGGGGTTCACCACGTTTTCAACTTGCTTGAAGCTAACCT
Cl.11 (SEQ ID NO: 8)    911 ....................................................................

G15   (SEQ ID NO: 7)    981 TATTTCTAATACAGGTAAAGACCCACTTAACGCTATCATCACAGCTGCGATGACTGCTCAAGCTGGTGCA
Cl.11 (SEQ ID NO: 8)    981 ....................................................................

G15   (SEQ ID NO: 7)   1051 ACACTTGCTGTTGGTGTTAAAACTAAAGACTCTAAGTTGAAAGCTCTCGCTTTCCCTGCAAGTCTTTCAG
Cl.11 (SEQ ID NO: 8)   1051 ....................................................................

G15   (SEQ ID NO: 7)   1121 CAGTACTTGGTATCACTGAACCAGCTATCTTCGGGGTTAACCTTCGTTTCGGTAAACCATTTATCATGGG
Cl.11 (SEQ ID NO: 8)   1121 ....................................................................

G15   (SEQ ID NO: 7)   1191 TCTTATCGCTGGTGCTGCTGGTGGTTGGTTGGCATCAATCCTTAACCTTGCTGGTACAGGATTGGTGTA
Cl.11 (SEQ ID NO: 8)   1191 ....................................................................

G15   (SEQ ID NO: 7)   1261 ACAATCGTTCCTGGTACTCTTCTCTACCTAAATGGTCAAGTACTTAAGTATGTAATCATGGTACTTGTAA
Cl.11 (SEQ ID NO: 8)   1261 ....................................................................

G15   (SEQ ID NO: 7)   1331 CACTTGCTCTTGGTTTCGCTCTTACTTGGATCTTTGGATATAAAGAGGAAGAGGTTGAAGCTCAAACAGA
Cl.11 (SEQ ID NO: 8)   1331 ............................................................T......

G15   (SEQ ID NO: 7)   1401 AGTTGTTGCTGAAGATATCGCCTCAGCAGGTTCTGCTCCAGTTGCATTGCAAGCTGAAACAATTGCTGCA
Cl.11 (SEQ ID NO: 8)   1401 ....................................................................

G15   (SEQ ID NO: 7)   1471 CCACTTAAAGGTGAAGTTGTAGCTTTGGAAAATGTAAATGACCCAGTCTTCTCTCTTCAGGAGCTATGGGTA
Cl.11 (SEQ ID NO: 8)   1471 ....................................................................
```

FIGURE 8A

```
G15   (SEQ ID NO: 7)  1541 AAGGTGCCGCTATCAAACCTTCAGGTAACCGAGTTGTTGCACCATTTGATGGTGAAGTGCAAATTGCCTT
Cl.11 (SEQ ID NO: 8)  1541 ......................................................................

G15   (SEQ ID NO: 7)  1611 CCCAACAGGTCACGCTTACGGTCTTAAATCTGATAAAGGTGCTGAAGTGCTTATCCACATCGGTATCGAT
Cl.11 (SEQ ID NO: 8)  1611 ......................................................................

G15   (SEQ ID NO: 7)  1681 ACTGTCTCACTTGACGGTAAAGGATTTGATGCTAAGGTTCAAGCAAATCAACGTGTTAAAAAAGGTGATG
Cl.11 (SEQ ID NO: 8)  1681 ......................................................................

G15   (SEQ ID NO: 7)  1751 TCTTGGCTACCTTCGATAGCTCAGTTATCACTGAAGCAGGTCTTGACGATACAACTATGGTTATCGTTAC
Cl.11 (SEQ ID NO: 8)  1751 ......................................................................

G15   (SEQ ID NO: 7)  1821 AAACACTGCAGACTACGAAGATGTTTCATCAGTAGCAACTGGTTCAGTTGCTGAGGGTGATGACTTCATC
Cl.11 (SEQ ID NO: 8)  1821 ......................................................................

G15   (SEQ ID NO: 7)  1891 GCAGTTAAATAA
Cl.11 (SEQ ID NO: 8)  1891 ............
```

FIGURE 8A (cont.)

ScrA protein

```
G15   (SEQ ID NO: 9)    1 MDYKQIAKEVIEALGGRENVNSVAHCATRLRVMVKDENKINKEKAENIEKVQGAFFNSGQYQMIFGTGTV
Cl.11 (SEQ ID NO: 10)   1 ......................................................................

G15   (SEQ ID NO: 9)   71 NKIYDEVVAQGLPTASKDEQKAEAAKQGNWFQRAIRSFGDVFVPLLPAIVATGLFMGIRGAINNDTVLAL
Cl.11 (SEQ ID NO: 10)  71 ......................................................................

G15   (SEQ ID NO: 9)  141 FGTTSKAFAATDFYTYTVVLTDTAFAFFPALICWSAFNVFGGSPLLGLVLGLMMVNNALPNAWDVVSGAA
Cl.11 (SEQ ID NO: 10) 141 ......................................................................

G15   (SEQ ID NO: 9)  211 KPIYFFDFIPVVGYQNSVLPAFFVGLIGAKFEQWVRKWVPDILDLLLRPLVVFAVMSALALFIIGPVFHT
Cl.11 (SEQ ID NO: 10) 211 ......................................................................

G15   (SEQ ID NO: 9)  281 VESYVLAGTEWILALPFGLAGLVLGGIHQIIVVTGVHHVFNLLEANLISNTGKDPLNAIITAAMTAQAGA
Cl.11 (SEQ ID NO: 10) 281 ......................................................................

G15   (SEQ ID NO: 9)  351 TLAVGVKTKDSKLKALAFPASLSAVLGITEPAIFGVNLRFGKPFIMGLIAGAAGGWLASILNLAGTGFGV
Cl.11 (SEQ ID NO: 10) 351 ......................................................................

G15   (SEQ ID NO: 9)  421 TIVPGTLLYLNGQVLKYVIMVLVTLALGFALTWIFGYKEEEVEA F EVVAEDIASAGSAPVALQAETIAA
Cl.11 (SEQ ID NO: 10) 421 ............................................. ------------------------

G15   (SEQ ID NO: 9)  491 PLKGEVVALENVNDPVFSSGAMGKGAAIKPSGNRVVAPFDGEVQIAFPTGHAYGLKSDKGAEVLIHIGID
Cl.11 (SEQ ID NO: 10)     ----------------------------------------------------------------------

G15   (SEQ ID NO: 9)  561 TVSLDGKGFDAKVQANQRVKKGDVLATFDSSVITEAGLDDTTMVIVTNTADYEDVSSVATGSVAEGDDFI
Cl.11 (SEQ ID NO: 10)     ----------------------------------------------------------------------

G15   (SEQ ID NO: 9)  631 AVK
Cl.11 (SEQ ID NO: 10)     ---
```

FIGURE 8B

*galR* gene

```
Cl.11    (SEQ ID NO: 11)   1 ATGGCTACATTAGCAGATATCGCAAAATTAGCAGGTGTATCTATTTCAACTGTTTCACGTGTTCTTAATA
Cl.11R15 (SEQ ID NO: 12)   1 ......................................................................

Cl.11    (SEQ ID NO: 11)  71 AAGATGAAACTCTTTCCGTAACAGAGGATACTAGACATCGGATATTAACTATCGCTGATGAAATCGGATA
Cl.11R15 (SEQ ID NO: 12)  71 ......................................................................

Cl.11    (SEQ ID NO: 11) 141 TACTAAATACAAAACAATTAATAATTCAAAAAAAGAAAAGTATCAAGTGGCAATTATTCAATGGGTTAGT
Cl.11R15 (SEQ ID NO: 12) 141 ......................................................................

Cl.11    (SEQ ID NO: 11) 211 GAAGAACACGAGTTAGATGACATCTACTATTATAATATTAGACTTGGTATTGAAAAAAGAGCCTATGAAC
Cl.11R15 (SEQ ID NO: 12) 211 ......................................................................

Cl.11    (SEQ ID NO: 11) 281 [T]AGACTACGAGATGCTTCACTTTTTCAACGACATTCCTTCAAGTCTAGGAGAGGAGGTCGTTGGTGTACT
Cl.11R15 (SEQ ID NO: 12) 281 [C].....................................................................

Cl.11    (SEQ ID NO: 11) 351 ATGTATCGGAAAATTTAGTCGTGAACAAATTGCGAAACTAGAAAGACTAAAAAAGACTCTGGTCTTTGTT
Cl.11R15 (SEQ ID NO: 12) 351 ......................................................................

Cl.11    (SEQ ID NO: 11) 421 GATAGTGATACTCTTAATCAAGGACATCCATGTGTTACTACTGATTTTGAAAACTCCGTACAATCGGCAC
Cl.11R15 (SEQ ID NO: 12) 421 ......................................................................

Cl.11    (SEQ ID NO: 11) 491 TCTGTTATCTTAAAGAACAAGGTTGTAATAATATAGGCCTACTCATTGGGCAAGAAAAAACAACAGATGC
Cl.11R15 (SEQ ID NO: 12) 491 ......................................................................

Cl.11    (SEQ ID NO: 11) 561 AACTGAAATCATTTCTGATCCTCGTTTACGTTCTTATCGAAACTACTGTATGGAAAAGGGAATCTATGAC
Cl.11R15 (SEQ ID NO: 12) 561 ......................................................................

Cl.11    (SEQ ID NO: 11) 631 CCTCTTTTTATTCTGACTGGTGACTTCACTGTCCAATCTGGCTATGAACTTCTTGATTCTAAGATTAAGA
Cl.11R15 (SEQ ID NO: 12) 631 ......................................................................

Cl.11    (SEQ ID NO: 11) 701 GTGGAGCTACTTTACCTGATGCTTACTTTGCGGCTAGTGATAGTCTAGCTATTGGTGCACTCAGAGCACT
Cl.11R15 (SEQ ID NO: 12) 701 ......................................................................

Cl.11    (SEQ ID NO: 11) 771 TCAGGAAAATGGTATCAAGGTCCCTGACGACATTCAAATTATCTCTTTTAACGATACAACTCTAGCTAAA
Cl.11R15 (SEQ ID NO: 12) 771 ......................................................................

Cl.11    (SEQ ID NO: 11) 841 CAAGTGTATCCTCCACTTTCTAGTGTCACTGTCTATACAGAAGAAATGGGACGAACAGCTATGGATATTC
Cl.11R15 (SEQ ID NO: 12) 841 ......................................................................

Cl.11    (SEQ ID NO: 11) 911 TCAATAAACAATTATTAGCACCTCGAAAAATACCAACACTTACTAAACTAGGAACAAAATTAACATTAAG
Cl.11R15 (SEQ ID NO: 12) 911 ......................................................................

Cl.11    (SEQ ID NO: 11) 981 AAACAGTACAAAATAG
Cl.11R15 (SEQ ID NO: 12) 981 ................
```

FIGURE 9A

GalR protein

```
Cl.11    (SEQ ID NO: 13)   1 MATLADIAKLAGVSISTVSRVLNKDETLSVTEDTRHRILTIADEIGYTKYKTINNSKKEKYQVAIIQWVS
Cl.11R15 (SEQ ID NO: 14)   1 .....................................................................

Cl.11    (SEQ ID NO: 13)  71 EEHELDDIYYYNIRLGIEKRAYE[L]DYEMLHFFNDIPSSLGEEVVGVLCIGKFSREQIAKLERLKKTLVFV
Cl.11R15 (SEQ ID NO: 14)  71 .......................[P].............................................

Cl.11    (SEQ ID NO: 13) 141 DSDTLNQGHPCVTTDFENSVQSALCYLKEQGCNNIGLLIGQEKTTDATEIISDPRLRSYRNYCMEKGIYD
Cl.11R15 (SEQ ID NO: 14) 141 .....................................................................

Cl.11    (SEQ ID NO: 13) 211 PLFILTGDFTVQSGYELLDSKIKSGATLPDAYFAASDSLAIGALRALQENGIKVPDDIQIISFNDTTLAK
Cl.11R15 (SEQ ID NO: 14) 211 .....................................................................

Cl.11    (SEQ ID NO: 13) 281 QVYPPLSSVTVYTEEMGRTAMDILNKQLLAPRKIPTLTKLGTKLTLRNSTK
Cl.11R15 (SEQ ID NO: 14) 281 ..................................................
```

FIGURE 9B

SUCROSE NEGATIVE *STREPTOCOCCUS THERMOPHILUS* FOR USE IN PREPARATION OF FERMENTED PRODUCTS

CROSS-REFERENCE TO RELATED APPLICATIONS

This application is a National Phase of PCT Application No. PCT/EP2020/088014, filed Dec. 30, 2020, which claims the benefit of EP Application Serial No. 19306785.7, filed Dec. 30, 2019, the disclosures of each of which are hereby incorporated by reference in their entireties.

FIELD OF THE INVENTION

The present invention relates to novel sucrose negative (Suc−) *Streptococcus thermophilus* strains, compositions comprising said strains, uses thereof, methods for obtaining such strains and methods for the preparation of fermented food products.

TECHNICAL BACKGROUND

*Streptococcus thermophilus* (also referred to as *Streptococcus salivarius* subsp. *thermophilus* and hereinafter also referred to as *S. thermophilus*) is a gram-positive lactic acid bacterium that is widely used in the preparation of fermented milk products. *S. thermophilus* is commonly used together with *Lactobacillus delbrueckii* subsp. *bulgaricus* (also referred to as *L. bulgaricus*) as a starter culture to prepare yogurt and other types of fermented milks.

Yogurts and other fermented milk products are widely consumed and contribute to a healthy diet by providing essential nutrients. However unflavoured fermented milk products have characteristic tart or acidic flavours, thus flavoured and sweetened fermented milk products are popular. Increasing consumer awareness of the benefits of a low-sugar diet together with a trend towards what the consumer perceives as "natural" products has led to a need for the development of fermented milk products with a reduced sugar content that use natural sweetening agents (e.g. *stevia*). The use of high sugar producing strains of *S. thermophilus* and *L. Bulgaricus* strains has also been proposed as a means of increasing the sweetness of fermented milk products.

WO 2013/160413 discloses mutant *S. thermophilus* strains having sweetening properties due to their secretion of glucose. These strains are characterized by a mutation in the glucokinase (glcK) gene and are described as being suitable for use in the preparation of fermented milk products. However, it is also disclosed that for such strains the fermentation process is delayed by 2-5 hours requiring at least 20 hours of fermentation. Sorensen et al. (Appl Environ Microbiol. 2016 Apr. 22) also disclose glucose secreting *S. thermophilus* strains St1-GS-1; St1-GS-2; St2-GS-1; S2-GS-2. Strains St1-GS-2 and St2-GS-2 could not acidify milk and glucokinase mutant strains (i.e. St1-GS-1 and St2-GS-1) displayed a lag of 2-3 hours over the parent strains in onset of acidification.

WO 2011/026863 discloses highly texturizing *S. thermophilus* strains with mutations in the galK gene that produce a high viscosity fermented milk. WO 2017/103051 discloses *S. thermophilus* strains with enhanced properties for sweetening of food products in combination with improved texturizing properties.

Nevertheless, it remains challenging to reduce the amount of sugar required for the preparation of fermented products while ensuring a product having good organoleptic properties, low amounts of added sugar and having a so-called "clean label" (a short ingredient list, using as many consumer recognizable ingredients as possible). Moreover, the acidity of fermented products can also be increased after the lactic fermentation by post acidification due to the consumption of other sugars by the bacteria. Consequently, it is sometimes necessary to use an increased quantity of sugar in the original recipe or to add sugar after the fermentation.

There thus remains a need for means for the preparation of fermented products using a reduced amount of sucrose ingredients while having good organoleptic qualities.

SUMMARY OF THE INVENTION

The present invention follows from the hypothesis formulated by the Inventors that *S. thermophilus* strains rendered deficient in sucrose metabolism could reduce the amount of sugar required in the preparation of fermented food products such as fermented milk products and limit undesired post-acidification, while maintaining the properties of said strains necessary for the preparation of fermented food products, e.g. the capacity to metabolize lactose in order to effectively ferment dairy milk and the capacity to produce exopolysaccharides (EPS) in order to texturize the fermented product. However, the selection of such strains has been proved difficult and significant attempts made by the Inventors using a screening strategy failed to isolate sucrose negative (Suc−) variants of high-performance *S. thermophilus* strains.

Unexpectedly, the Inventors discovered that such variants can be obtained by selecting galactose positive (Gal+) variants prior to the selection of Suc− variants. Accordingly, the present invention provides Suc− Gal+ *Streptococcus thermophilus* strains. The present invention also provides compositions comprising said strains, uses thereof, methods for obtaining such strains and methods for the preparation of fermented food products using such compositions.

DETAILED DESCRIPTION OF THE INVENTION

As used herein the term "sucrose negative" (or Suc−) means the inability of a bacterium to metabolize sucrose. According to the present invention, a Suc− *S. thermophilus* strain is not able to grow in a medium containing sucrose as the sole source of carbon. Conversely, the term "sucrose positive" (or Suc+) means the ability of a bacterium to metabolize sucrose or to grow in a medium containing sucrose as a sole source of carbon. These phenotypes can be determined using techniques well known by a skilled person in the art. For example, these phenotypes can be assessed by inoculating—into a M17 broth containing 2% sucrose—an overnight culture of the *S. thermophilus* strain to be tested at a rate of 1%, and incubating for 20 hours at 37° C., wherein a pH of 6 or above at the end of incubation is indicative of a Suc− phenotype and a pH of 5.5 or lower at the end of incubation is indicative of a Suc+ phenotype. Alternatively the metabolic profile of a bacterial strain can be determined using commercially available kits such as the API gallery (bioMerieux).

The above definition also applies to the phenotypes related to other carbohydrates fermentable by lactic acid bacteria, in particular lactose, galactose, glucose or fructose.

Accordingly, the terms "Lactose negative" (or Lac−), "galactose negative" (or Gal−), "glucose negative" (or Glu−) or "fructose negative" (or Fru−) refer to the inability of a bacterium to metabolize lactose, galactose, glucose or fructose respectively. Conversely, the terms "Lactose positive" (or Lac+), "galactose positive" (or Gal+), "glucose positive" (or Glu+) or "fructose positive" (or Fru+) refer to the ability of a bacterium to metabolize lactose, galactose, glucose or fructose respectively. As detailed above, these phenotypes can be easily assessed by testing growth of *S. thermophilus* in a medium containing the sugar of interest as a sole source of carbon.

As used herein the term "fermentation" shall be taken to mean the metabolism of a substance by microorganisms, e.g. bacteria, yeasts, or other microorganisms. As used herein the term "highly fermentative" as used in reference to lactic acid bacteria shall be taken to mean a strain thereof that is capable of significantly reducing the pH of a suitable medium at a suitable culture temperature. In regards to a *S. thermophilus* strain, said strain shall be capable of reducing the pH of a media comprising semi-skimmed cow milk supplemented with yeast extract (2 g/l) when inoculated with a 1% volume inoculum by at least 1.8 pH points (e.g. from 6.5 to 4.7) in less than 10 hours, more preferably less than 9, 8, 7, 6, 5 or 4 hours when cultured at a temperature of about 37° C. to about 43° C., more preferably 37° C. to 43° C. Said inoculum comprises about $10^5$ cfu to about $10^7$ cfu of said *S. thermophilus* per gram of inoculum composition, more preferably about $10^6$ cfu to about $10^7$ cfu.

As used herein, the term "texturizing" means that a *S. thermophilus* strain is able to significantly increase the viscosity of a fermented product by the production of exopolysaccharides (EPS). Methods for determining the texture of milk include measuring the shear stress (viscosity) of the fermented milk and are readily known in the art and also described in the examples below.

As used herein the term "stable composition" shall be taken to mean a composition that does not present sedimentation and/or serum separation.

As used herein the term "x % (w/w)" is equivalent to "x g per 100 g".

As used herein the terms "dairy composition", "milk-based composition" or "dairy product" shall be taken to mean a product or composition comprising essentially of or consisting of milk or milk components and optionally further ingredients.

As used herein the term "fermented dairy" shall be taken to mean a product or composition that is the product of the acidifying fermentation of a milk-based composition by a starter culture of fermenting microorganisms, in particular bacteria, preferably lactic acid bacteria. As used herein the term "fermented milk" shall be taken to mean a product or composition derived from milk by the acidifying action of at least one lactic acid bacterium. Accordingly, as used herein a fermented dairy product can thus be a fermented milk, such as a yoghurt (e.g. a set, stirred or drink yogurt), or a fresh cheese such as a white cheese or a "petit-Suisse". It can be also be a strained fermented milk such as a strained yoghurt (e.g. a concentrated or Greek-style yoghurt).

The terms "fermented milk" and "yogurt" or "yoghurt" are given their usual meanings in the field of the dairy industry, that is, products suitable for human consumption and originating from acidifying lactic fermentation of a milk substrate. These products can contain secondary ingredients such as fruits, vegetables, sugar, etc. The expression "fermented milk" may be used to refer to fermented milks other than yogurts e.g. "Kefir", "Kumtss", "Lassi", "Dahi", "Leben", "Filmjolk", "Villi", "*Acidophilus* milk".

The term "yogurt" or "yoghurt" as used herein shall be taken to mean fermented milk obtained by the acidifying lactic fermentation of specific thermophilic lactic acid bacteria such as *Lactobacillus delbrueckii* subsp. *bulgaricus* and *Streptococcus thermophilus* (also referred to as *Streptococcus salivarius* subsp. *thermophilus*), which must be in the living state in the finished product at a minimum CFU. In certain countries, regulations allow the addition of further lactic acid bacteria to yoghurt such as but not limited to strains of *Bifidobacterium* and/or *Lactobacillus acidophilus* and/or *Lactobacillus casei*. These additional lactic acid bacteria strains are intended to impart various properties to the finished product, such as that of providing organoleptic qualities, favoring equilibrium of intestinal flora or modulating the immune system.

As used herein the term "strained fermented dairy composition" shall be taken to mean a fermented dairy composition which has been subjected to a post-fermentation acid whey separation process.

As used herein the term "spoonable" shall be taken to mean a solid or semi-solid that may be consumed by means of a spoon or other utensil.

As used herein the term "cfu" or "CFU" shall be taken to be an abbreviation of the term "colony forming unit".

As used herein the term "CNCM I-" followed by a 4 digit number shall be taken to refer to a strain deposited at the Collection Nationale de Cultures de Microorganismes (CNCM) 25 rue du Docteur Roux, Paris, France under the Budapest Treaty with an accession number corresponding to said 4 digit number, e.g. CNCM I-5448.

As used herein reference to a bacterial strain or species shall be taken to include functionally equivalent bacteria derived therefrom such as but not limited to mutants or variants. These mutants or variants can be strains wherein one or more endogenous gene(s) of the parent strain has (have) been mutated by non-targeted means (random mutagenesis induced e.g. by UV radiation or alkylating agents), for instance to modify some of their metabolic properties (e.g., their ability to ferment sugars, their resistance to acidity, their survival to transport in the gastrointestinal tract, their post-acidification properties or their metabolite production).

As used herein the term "GMO" shall be taken to mean an organism, with the exception of human beings, in which the genetic material has been altered in a way that does not occur naturally by mating and/or natural recombination, said term shall be taken to encompass for example organisms that are the subject of genetic transformation to include exogenous DNA, or site targeted gene editing such as CRISPR/Cas9 methodologies. The term "GMO" shall be taken to exclude and not encompass an organism in which the genetic material has been altered by random mutagenesis such as by chemical or radiation means followed by a phenotypic selection.

In the present text, strains, mutants and variants derived from a parent species or strain will be considered as being encompassed by reference to said parent species or strain, e.g. the phrases "*Streptococcus thermophilus*" and "CNCM I-5448" shall be taken to include strains, mutants and variants derived therefrom. Accordingly, as used herein reference to a bacterial strain specified by an accession or deposit number shall be taken to encompass variants thereof having at least 95% identity (see: Stackebrandt & Goebel, 1994, Int. J. Syst. Bacteriol. 44:846-849). In a particularly preferred embodiment, said variant has at least 97% identity with the 16S rRNA sequence of said specified strain, more preferably at least 98% identity, more preferably at least 99% or more identity.

As used herein the term "substantially pure" when used in reference to a bacterial strain refers to the percent of said bacterial strain relative to the total micro-organism content. Substantially pure can be at least about 99.99%, at least about 99.90%, at least about 99.50%, at least about 99.00%, at least about 95.00%, at least about 90.00%, at least about 85.00%, or at least about 75.00%.

As used herein, a "lactic acid bacterium" is a Gram-positive, acid-tolerant, generally non-sporulating and non-respiring, either rod- or cocci-shaped bacterium that is able to ferment sugars into lactic acid.

Streptococcus thermophilus

In an aspect, the present invention provides a strain of Streptococcus thermophilus characterized in that it is galactose positive (Gal+) and sucrose negative (Suc−).

In an embodiment, the present invention provides a strain as defined above further characterized in that it is fructose negative (Fru−).

In an embodiment, the present invention provides a strain as defined above further characterized in that it is glucose positive (Glu+).

In an embodiment, the present invention provides a strain as defined above further characterized in that it is lactose positive (Lac+).

In a preferred embodiment, the present invention provides a strain of Streptococcus thermophilus characterized in that it is Gal+ Suc− Fru−, preferably Gal+ Suc− Fru− Glu+, most preferably Gal+ Suc− Fru− Glu+ Lac+.

Such strains are particularly appropriate for the preparation of flavored fermented products since they limit or avoid the decrease of sucrose and/or fructose present in the original mixture.

In a most preferred embodiment, the present invention provides a strain of Streptococcus thermophilus as defined above characterized in that it is highly fermentative.

In a preferred embodiment, the present invention provides a strain as defined above further characterized in that it is texturizing.

In a preferred embodiment, the present invention provides a strain as defined above further characterized in that it is non-GMO organism with the exception of a variant of a naturally occurring strain that has been derived by a process of random mutagenesis by chemical or radiation means and phenotypic selection. Thus for example a strain of the invention may be a galactose positive (Gal+) and sucrose negative (Suc−) derived from a wild type S. thermophilus strain by means of UV radiation or alkylating agent random mutagenesis followed by a selection based on metabolic profile.

In an embodiment, the strain of the invention produces exopolysaccharide when cultured in a milk based medium, and in preferred embodiments, may be used to prepare a fermented milk product having a viscosity greater than 800 mPa·s, more preferably greater than 900 mPa·s and most preferably greater than 1000 mPa·s, at 4° C. In embodiments, the composition has a viscosity range of 800 to 2000 mPa·s, or 800 to 1500 mPa·s, at 4° C. Said viscosity being measured using a refrigerated MCR301 rheometer equipped with a 27 mm concentric cylinder system according to equation I after 7 days of storage at 4° C.

In an embodiment, the present invention provides a strain of Streptococcus thermophilus characterized in that its genome comprises at least one mutation selected from the group consisting of a substitution in the lacS gene corresponding to SEQ ID NO: 1, a substitution in the galK promoter, preferably in the Cre site corresponding to TGAAAGGGGTTACG (SEQ ID NO: 15), a non-sense mutation in the scrA gene corresponding to SEQ ID NO: 7, and a substitution in the galR gene corresponding to SEQ ID NO: 11.

In an embodiment, the genome of a strain according to the invention comprises two, three or all mutations from the group consisting of a substitution in the lacS gene corresponding to SEQ ID NO: 1, a substitution in the galK promoter, preferably in the Cre site corresponding to SEQ ID NO: 15, a non-sense mutation in the scrA gene corresponding to SEQ ID NO: 7, and a substitution in the galR gene corresponding to SEQ ID NO: 11.

In an embodiment, the substitution in the lacS gene is a substitution, in particular C/A, in position 1159 of SEQ ID NO: 1. In an embodiment, the substitution in the galK promoter is a substitution, in particular G/T, in position 228 of SEQ ID NO: 5. In an embodiment, the non-sense mutation in the scrA is a substitution, in particular C/T, in position 1393 of SEQ ID NO: 7. In an embodiment, the substitution in the galR gene is a substitution, in particular T/C, in position 281 of SEQ ID NO: 11.

In an embodiment, the genome of a strain according to the invention comprises a substitution, in particular C/A, in position 1159 of SEQ ID NO: 1, a substitution, in particular G/T, in position 228 of SEQ ID NO: 5 and a substitution, in particular C/T, in position 1393 of SEQ ID NO: 7.

In an embodiment, the present invention provides a strain of Streptococcus thermophilus characterized in that its genome comprises at least one sequence selected from the group consisting of: SEQ ID NO: 2, SEQ ID NO: 6, SEQ ID NO: 8 and SEQ ID NO: 12.

In an embodiment, the present invention provides a strain of Streptococcus thermophilus characterized in that its genome comprises two, three or all sequences selected from the group consisting of: SEQ ID NO: 2, SEQ ID NO: 6, SEQ ID NO: 8 and SEQ ID NO: 12.

In an embodiment, the present invention provides a strain of Streptococcus thermophilus characterized in that its genome comprises the sequences SEQ ID NO: 2, SEQ ID NO: 6 and SEQ ID NO: 8.

In an embodiment, the present invention provides a strain of Streptococcus thermophilus characterized in that it expresses at least one protein selected from the group consisting of a LacS protein of SEQ ID NO: 4, a ScrA protein of SEQ ID NO: 10 and a GalR protein of SEQ ID NO: 14.

In an embodiment, the present invention provides a strain of Streptococcus thermophilus characterized in that it expresses two, three or all proteins selected from the group consisting of a LacS protein of HQ ID NO: 4, a ScrA protein of HQ ID NO: 10 and a GalR protein of HQ ID NO: 14.

In an embodiment, the present invention provides a strain of Streptococcus thermophilus characterized in that it expresses a LacS protein of SEQ ID NO: 4, a ScrA protein of SEQ ID NO: 10.

In an embodiment, the present invention provides the strain Streptococcus thermophilus CNCM I-5448. This strain has been deposited at the Collection Nationale de Cultures de Microorganismes (CNCM) (Institut Pasteur, 25 Rue du Docteur Roux, Paris, France) under the Budapest Treaty on 20 Nov. 2019 under reference number CNCM I-5448. The deposit was made in accordance with the Budapest Treaty on the International Recognition of the Deposit of Microorganisms for the Purposes of Patent Procedure, as provided therein the applicant requests that a sample of the deposited micro-organisms only be made available to an independent expert, until the date on which the patent may be granted. The strain *S. thermophilus* CNCM I-5448 corresponds to clone 11R15 described in the examples below.

In an embodiment, the present invention provides the strain *S. thermophilus* CNCM I-5448, that is substantially pure.

Methods for Obtaining Sucrose Negative Strains

Most wild type *S. thermophilus* strains are sucrose positive and to the development of sucrose negative variants by random mutagenesis has proven challenging. Further, the metabolic pathway of carbohydrates and the biosynthesis pathway of the exopolysaccharides are closely linked in *S. thermophilus* and a deleterious mutation in the sucrose metabolism drastically reduces the growth of *S. thermophilus*. However, as shown in the examples below, this difficulty of directly isolating Suc− variants is overcome by isolating Gal+ variants prior to the selection of Suc− variants.

Most wild type *S. thermophilus* strains are Gal− and almost all texturizing strains contain galactose in the EPS. Without wishing to be bound by theory, it was thus hypothesized that the galactose pathway could compensate for a deficiency in the sucrose pathway and allow the isolation of Suc− variants that also retain the texturizing capacity of the wild-type strain.

Accordingly, an aspect of the present invention relates to a method for obtaining a sucrose negative *S. thermophilus* strain comprising:

i) providing a first *S. thermophilus* strain,
ii) selecting at least one galactose positive clone thereof,
iii) mutating said selected clone(s) selected in ii), preferably by means of chemical or radiation and selecting at least one sucrose negative variant thereof.

In an embodiment, said first *S. thermophilus* strain is Gal− Suc+.

In a preferred embodiment, said first *S. thermophilus* strain is Gal− Suc+ Fru−.

In a most preferred embodiment, said first *S. thermophilus* strain is Gal− Suc+ Fru− Glu+ Lac+.

In an embodiment, said first *S. thermophilus* strain is an exopolysacharride producing texturizing strain.

Step ii) can be carried out by, but is not limited to, subculturing the first *S. thermophilus* strain in a medium with galactose as the sole carbon source, preferably in M17 medium, most preferably in a modified M17 medium (glycerophosphate 9 g/l).

Step iii) is preferably carried out by random mutagenesis, preferably by exposure to alkylating agents or UV exposure, more preferably by exposure to a dose of UV giving approximately 2% survival.

In an embodiment, said method further comprises:
iv) selecting a sucrose negative variant that is highly fermentative in a milk based medium and/or subculturing a sucrose negative variant in a milk based medium. This additional step allows the isolation at least one strain having faster milk fermentation capabilities.

Subculturing of a sucrose negative variant in a milk based medium is preferably carried out more than one time, for example 2, 3, 4, 5, 6, 7, 8, 9, 10, 11, 12, 13, 14 or 15 times. Preferably, subculturing is carried out at least 10 times, more preferably at least 15 times.

In an embodiment, step iii) is carried out by mutating the lacS gene corresponding to SEQ ID NO: 1, and/or the galK promoter, preferably in the Cre site corresponding to TGAAAGGGGTTACG (SEQ ID NO: 15), and/or the scrA gene corresponding to SEQ ID NO: 7, and/or the galR gene corresponding to SEQ ID NO: 11.

In an embodiment, step iii) is carried out by introducing a substitution in the lacS gene corresponding to SEQ ID NO: 1, and/or a substitution in the galK promoter, preferably in the Cre site corresponding to TGAAAGGGGTTACG (SEQ ID NO: 15), and/or a non-sense mutation in the ScrA gene corresponding to SEQ ID NO: 7, and/or a substitution in the galR gene corresponding to SEQ ID NO: 11.

In an embodiment, the substitution in the lacS gene is a substitution, in particular C/A, in position 1159 of SEQ ID NO: 1. In an embodiment, the substitution in the galK promoter is a substitution, in particular G/T, in position 228 of SEQ ID NO: 5. In an embodiment, the non-sense mutation in the scrA is a substitution, in particular C/T, in position 1393 of SEQ ID NO: 7. In an embodiment, the substitution in the galR gene is a substitution, in particular T/C, in position 281 of SEQ ID NO: 11.

Compositions of the Invention

In an aspect, the present invention provides compositions comprising a *Streptococcus thermophilus* strain as defined above.

Preferably, the composition comprises at least $10^5$, more preferably at least $10^6$ and most preferably at least $10^7$ colony forming unit (CFU) of a *S. thermophilus* strain of the invention per gram (g) of composition.

In embodiments, the composition comprises from $10^5$ to $10^{12}$ CFU of a *S. thermophilus* strain of the invention per gram (g) of composition. In embodiments, the composition comprises $10^6$ to $10^{11}$ CFU of a *S. thermophilus* strain of the invention per gram (g) of composition. In embodiments, the composition comprises at least $10^5$, $10^6$, $10^7$, $10^8$, $10^9$, $10^{10}$, $10^{11}$ or $10^{12}$ CFU of a *S. thermophilus* strain of the invention per gram (g) of composition.

In an embodiment, the composition comprises at least $10^5$, $10^6$, $10^7$, $10^8$, $10^9$, $10^{10}$, $10^{11}$ or $10^{12}$ CFU of the strain *Streptococcus thermophilus* CNCM I-5448 per gram (g) of composition.

The bacterium as provided herein is suitable for use in edible compositions, accordingly in one embodiment the present invention provides a composition suitable for human consumption or ingestion, preferably by oral means. Accordingly, the composition comprises or consists of comestible matter. It is particularly preferred that the compositions of embodiments of the invention are substantially free of pathogenic or toxicogenic matter. The composition according to embodiments of the invention may be a medicament or pharmaceutical composition. In a particularly preferred embodiment, the composition according to the invention may be a non-therapeutic composition, preferably a nutraceutical composition, a nutritional composition and/or a food composition. It is particularly preferred that the food composition is a fermented food composition, preferably a fermented dairy composition. Further compositions according to embodiments of the invention also include food additives, food ingredients, nutritional supplements, nutritional formulas, baby foods, infant milk formulas and infant follow-on formulas.

The composition may comprise further additional strains of *Bifidobacterium* and/or lactic acid bacteria; typically 1, 2, 3, 4 or more additional strains. Examples of *Bifidobacterium* that can be used include but are not limited to *Bifidobacterium animalis* (for example *Bifidobacterium animalis* subsp. *animalis* or *Bifidobacterium animalis* subsp. *lactis*); *Bifidobacterium longum*; *Bifidobacterium breve*; *Bifidobacterium bifidum*. Examples of lactic acid bacteria that can be used include but are not limited to Lactobacilli (for example

*Lactobacillus acidophilus, Lactobacillus buchneri, Lactobacillus delbrueckii*, in particular *L. delbrueckii* subsp. *bulgaricus* or *lactis* or *delbrueckii, Lactobacillus casei, Lactobacillus plantarum, Lactobacillus reuteri, Lactobacillus johnsonii, Lactobacillus helveticus, Lactobacillus brevis, Lactobacillus rhamnosus*); Lactococci (for example *Lactococcus lactis*, typically *Lactococcus lactis* subsp. *lactis* or *Lactococcus lactis* subsp. *cremoris*). Preferably the composition further comprises *Lactobacillus* and/or *Streptococcus*. For the preparation of yogurt, the composition typically comprises *Lactobacillus bulgaricus* (also referred to as *Lactobacillus delbrueckii* subsp. *bulgaricus*) and *Streptococcus thermophilus*, optionally with additional microorganisms such as but not limited to probiotic species or other species that may provide desirable organoleptic or other qualities to the composition, e.g. further strains of *Lactococcus lactis*.

Accordingly, in one embodiment the present invention provides a composition comprising the strain *Streptococcus thermophilus* CNCM I-5448 and further comprising at least one strain of *Lactobacillus bulgaricus* and optionally one or more strains of *Lactococcus lactis* and/or *Bifidobacterium*.

Dairy Compositions

The strains of the present invention are particularly suited to the preparation of fermented compositions. Accordingly, in an embodiment the present invention provides a dairy composition, preferably a fermented dairy composition. The dairy composition of the invention comprises milk, preferably fermented milk. Preferably the composition comprises at least about 30% (w/w) milk, more preferably at least about 50% (w/w) milk and even more preferably at least about 70% (w/w) milk. In embodiments, the composition comprises at 30% to 100% (w/w) milk. In embodiments, the composition comprises 50% to 100% (w/w) milk. In embodiments, the composition comprises 70% to 100% (w/w) milk. Preferably said milk is vegetal and/or animal milk, more preferably soya, almond, oat, hemp, spelt, coconut, rice, goat, ewe, camel, mare or cow milk, and most preferably to cow milk. Preferably said milk(s) are heat-treated, typically pasteurized, to ensure sterility. Preferably said heat treatment is carried out prior to the preparation of the fermented dairy composition.

Preferably, said milk comprises one or more of skimmed, partially-skimmed or non-skimmed milk. Preferably said milk or milks may be in liquid, powdered and/or concentrated form. In one embodiment said milk further comprises milk components preferably selected from the group consisting of cream, casein, caseinate (for example calcium or sodium caseinate), whey proteins notably in the form of a concentrate (WPC), milk proteins notably in the form of a concentrate (MPC), milk protein hydrolysates, and mixtures thereof. In one embodiment said mixture further comprises plant and/or fruit juices. In one embodiment said milk or milks may be enriched or fortified with further milk components or other nutrients such as but not limited to vitamins, minerals, trace elements or other micronutrients.

Preferably, the dairy composition comprises above about 0.3 g per 100 g by weight free lactic acid, more preferably above about 0.7 g or 0.6 g per 100 g by weight free lactic acid. In embodiments, the composition comprises 0.3 g to 0.7 grams per 100 g by weight free lactic acid.

Preferably, the dairy composition comprises a protein content at least equivalent to that of the milk or milks from which it is derived, preferably at least about 2.5%, more preferably at least about 3% or 3.5% (w/w). Preferably the composition has a pH equal to or lower than 5, preferably between about 3 and about 4.5 and more preferably between about 3.5 and about 4.5.

Preferably, the fermented dairy composition after 7 days of storage at 4° C. has a viscosity greater than 800 mPa·s, more preferably greater than 900 mPa·s and most preferably greater than 1000 mPa·s, at 4° C., according to equation I. In embodiments, the composition has a viscosity range of 800 to 2000 mPa·s, or 800 to 1500 mPa·s, at 4° C., as measured using a refrigerated MCR301 rheometer equipped with a 27 mm concentric cylinder system according to equation I.

The fermented dairy composition according to embodiments of the invention is preferably a product selected from the group comprising yogurt, set yogurt, stirred yogurt, pourable yogurt, yogurt drink, frozen yogurt, kefir, buttermilk, quark, sour cream, fresh cheese and cheese. In one embodiment the composition according to embodiments of the invention is a drinkable composition, more preferably a fermented milk drink such as but not limited to a yogurt drink, kefir etc. In an alternative embodiment the composition according to embodiments of the invention is a composition that is spoonable, such as a set or stirred yogurt or equivalent thereof.

In an embodiment the fermented dairy composition is a strained fermented dairy composition. The strained fermented dairy composition preferably has the following contents (% by weight):

from 8.5% to 11.0% of milk protein
from 0.0% to 8.0% of fat, for example from 0.0% to 3.5% or from 3.5% to 8.0%
from 0.00% to 7.00% of lactose, for example from 2.80% to 6.00%

The pH of the strained fermented dairy composition can for example be of from 3.80 to 4.65.

Preferably the composition, according to embodiments of the invention, may be stored, transported and/or distributed at a temperature of from 1° C. to 10° C. for at least about 30 days, at least about 60 days or at least about 90 days from packaging and remain suitable for consumption.

In embodiments, the dairy compositions of the invention comprise at least $10^5$ cfu/g, more preferably at least $10^6$ cfu/g, such as at least $10^7$ cfu/g, e.g. at least $10^8$ cfu/g, such as at least $10^9$ cfu/g, e.g. at least $10^{10}$ cfu/g, such as at least $10^{11}$ cfu/g of a *S. thermophilus* strain of the invention per gram of dairy composition. In embodiments, the compositions of the invention comprise $10^5$ to $10^{12}$ or $10^6$ to $10^{10}$ colony forming unit (CFU) of a *S. thermophilus* strain of the invention per gram of composition, preferably *S. thermophilus* CNCM I-5448.

Preferably, the composition is a packaged product that comprises at least $10^6$, more preferably at least $10^7$ and most preferably at least $10^8$ colony forming unit (CFU) of *Streptococcus thermophilus* CNCM I-5448 per gram (g) of composition according to embodiments of the invention subsequent to storage, transport and/or distribution at a temperature of from 1° C. to 10° C. for at least about 30 days, at least about 60 days or at least about 90 days from packaging.

In embodiments, the composition is a packaged product that comprises $10^5$ to $10^{12}$ or $10^6$ to $10^{10}$ colony forming unit (CFU) of *Streptococcus thermophilus* CNCM I-5448 per gram (g) of composition according to embodiments of the invention subsequent to storage, transport and/or distribution at a temperature of from 1° C. to 10° C. for at least about 30 days, at least about 60 days or at least about 90 days from packaging.

In embodiments, the dairy composition further comprises an intermediate preparation. Intermediate preparations are known to the one skilled in the art. They are typically used to modify the taste, mouthfeel and/or texture of a dairy composition, for example of a fermented dairy composition. They can used also to introduce some additives such as nutrients. They typically comprise sweetening agents, flavors, color modifiers, cereals and/or fruit. Intermediate fruit preparations are for example slurries or fruit preparations. Flavors include for example fruit flavors, vanilla flavors, caramel flavors, coffee flavors, chocolate flavors.

Fruit preparations typically comprise fruits, as used herein the term "fruit" refers to any fruit form, including for example full fruits, pieces, purees, concentrates, juices etc.

The intermediate preparation or slurry typically comprises a stabilizing agent, having at least one stabilizer. The stabilizing agent can comprise at least two stabilizers. Such stabilizers are known to the one skilled in the art. They typically help in avoiding phase separation of solids, for examples of fruits or fruits extracts and/or in avoiding syneresis. They typically provide some viscosity to the composition, for example a viscosity (Bostwick viscosity at 20° C.) of from 1 to 20 cm/min, preferably of from 4 to 12 cm/min.

The stabilizing system or the stabilizer can for example be a starch, a pectin, agar, a xanthan, a carrageenan, a locust bean gum, or a mixture thereof. The amount of stabilizing system is typically of from 0.5 to 5% by weight.

The intermediate preparation can typically comprise organoleptic modifiers. Such ingredients are known by the one skilled in the art.

The organoleptic modifiers can be for example sweetening agents different from sugar, coloring agents, cereals and/or cereal extracts.

Examples of sweetening agents are ingredients referred to as High Intensity Sweeteners, such as sucralose, acesulfam K, aspartam, saccharine.

Examples of fruits include for example strawberry, peach, apricot, mango, apple, pear, raspberry, blueberry, blackberry, passion, cherry, and mixtures or associations thereof, such as peach-passion.

The fruits can be for example provided as:
frozen fruit cubes, for example 10 mm fruit cubes, for example Individual Quick Frozen fruit cubes, for example strawberry, peach, apricot, mango, apple, pear fruit cubes or mixtures thereof,
Aseptic fruit cubes, for example 10 mm fruit cubes, for example strawberry, peach, apricot, mango, apple or pear fruit cubes or mixtures thereof,
fruit purees, for example fruit purees concentrated from 2 to 5 times, preferably 3 times, for example aseptic fruit purees, for example strawberry, peach, apricot, mango, raspberry, blueberry or apple fruit purees or mixtures thereof,
single aseptic fruit purees, for example strawberry, raspberry, peach, apricot, blueberry or apple single aseptic fruit purees or mixture thereof,
frozen whole fruits, for example Individual Quick Frozen whole fruits, for example blueberry, raspberry or blackberry frozen whole fruits, or mixtures thereof,
mixtures thereof.

The ingredients and/or components of the intermediate preparation and the amounts thereof can be typically such that the composition has a brix degree of from 1 to 65 brix, for example from 1 to 10 brix, or from 10 to 15 brix, or from 15 to 20 brix, or from 20 to 25 brix, or from 25 to 30 brix, or from 30 to 35 brix, or from 35 to 40 brix, or from 40 to 45 brix, or from 45 to 50 brix, or from 50 to 55 brix, or from 55 to 60 brix, or from 55 to 60 brix, or from 60 to 65 brix.

A fruit preparation can for example comprise fruit in an amount of from 30% to 80% by weight, for example from 50 to 70% by weight.

The intermediate preparation can comprise water. It is mentioned that a part of the water can come from ingredients used to prepare the fruit preparation, for example from fruits or fruit extracts or from a phosphoric acid solution.

The fruit preparation can comprise pH modification agents such as citric acid. The fruit preparation can have a pH of from 2.5 to 5, preferably of from 2.8 to 4.2.

Typically a fruit preparation can be added in an amount of 5-35% by weight with reference to the total amount of composition. In embodiments the composition of the invention comprises up to about 30% (w/w) of said intermediate preparation, e.g. up to about 10%, 15%, 20%, 25% (w/w). In one embodiment, the composition according to embodiments of the invention comprise 1% to 30% (w/w) of said intermediate preparation. In alternative embodiments, the composition according to embodiments of the invention comprise 1% to 25% (w/w) of said intermediate preparation. In further alternative embodiments, the composition according to embodiments of the invention comprise 1% to 20% (w/w) of said intermediate preparation. In additional embodiments, the composition according to embodiments of the invention comprise 1% to 15% (w/w) of said intermediate preparation. In further additional embodiments, the composition according to embodiments of the invention comprise 1% to 10% (w/w) of said intermediate preparation.

Preferably the composition, according to embodiments of the invention is provided in a sealed or sealable container containing about 50 g, 60 g, 70 g, 75 g, 80 g, 85 g, 90 g, 95 g, 100 g, 105 g, 110 g, 115 g, 120 g, 125 g, 130 g, 135 g, 140 g, 145 g, 150 g, 200 g, 300 g, 320 g or 500 g or about 1 oz, 2 oz, 3 oz, 4 oz, 5 oz, 6 oz or 12 oz product by weight.

In embodiments, the composition, according to embodiments of the invention is provided in a sealed or sealable container containing about 50 g to 500 g, 60 g to 500 g, 70 g to 500 g, 75 g to 500 g, 80 g to 500 g, 85 g to 500 g, 90 g to 500 g, 95 g to 500 g, 100 g to 500 g, 105 g to 500 g, 110 g to 500 g, 115 g to 500 g, 120 g to 500 g, 125 g to 500 g, 130 g to 500 g, 135 g to 500 g, 140 g to 500 g, 145 g to 500 g, 150 g to 500 g, 200 g to 500 g, 300 g to 500 g, 320 g to 500 g or 500 g product by weight. In embodiments, the composition, according to embodiments of the invention is provided in a sealed or sealable container containing about 1 oz to 12 oz, 2 oz to 12 oz, 3 oz to 12 oz, 4 oz to 12 oz, 5 oz to 12 oz, 6 oz to 12 oz or 12 oz product by weight.

Inoculum Compositions

The *Streptococcus thermophilus* strain of the invention is useful as starter culture in the preparation of food compositions, such as fermented dairy products. Accordingly, in an embodiment, the present invention provides an inoculum comprising a strain of *S. thermophilus* as defined above that is suitable for the preparation of fermented dairy products. The inoculum of the invention is suitable for the direct inoculation of *S. thermophilus* strains into a composition comprising milk to provide fermented dairy products of the invention, typically without the need for a culture step prior to the said direct inoculation. In a preferred embodiment, the present invention provides an inoculum comprising the strain *S. thermophilus* CNCM I-5448.

Typically the inoculum further comprises excipient or carriers, the selection of which is within the scope of the skilled person but may include buffers or culture media. The inoculum may optionally comprise further components such as cryoprotectants, preservatives and/or additives including nutrients such as yeast extracts, cysteine, sugars and vitamins.

Typically the inoculum is for use in the preparation of fermented dairy products, according in one embodiment the inoculum of the invention may be provided to the dairy composition in quantities of up to about 500 mg/l.

Typically the inoculum is fresh, frozen, dried or lyophilized. The inoculum may be in liquid, dry, spray-dried or solid form. It is particularly preferred that the inoculum is in liquid form. The inoculum may be defrosted and/or dispersed in liquid (e.g. water) prior to inoculation into a composition comprising milk.

In embodiments, the inoculum comprises at least $10^6$ cfu, at least $10^7$ cfu, at least $10^8$ cfu, $10^9$ cfu, e.g. at least $10^{10}$ cfu, such as at least $10^{11}$ cfu of a *S. thermophilus* of the invention per gram of inoculum composition. In embodiments, the inoculum comprises $10^7$ to $10^{12}$ colony forming unit (CFU), or more preferably $10^{10}$ to $10^{12}$ colony forming unit (CFU) of a *S. thermophilus* strain of the invention per gram of inoculum.

Preferably, the inoculum comprising a *S. thermophilus* strain of the invention is substantially pure.

In a further embodiment, the present invention provides a mixture or kit of parts of the inoculum of the invention together with inoculum of *Bifidobacterium* and/or lactic acid bacteria.

Examples of *Bifidobacterium* that can be used include but are not limited to *Bifidobacterium animalis* (for example *Bifidobacterium animalis* subsp. *animalis* or *Bifidobacterium animalis* subsp. *lactis*); *Bifidobacterium longum; Bifidobacterium breve; Bifidobacterium* Examples of lactic acid bacteria that can be used include but are not limited to Lactobacilli (for example *Lactobacillus acidophilus, Lactobacillus buchneri, Lactobacillus delbrueckii*, in particular *L. delbrueckii* subsp. *bulgaricus* or *lactis, Lactobacillus casei, Lactobacillus plantarum, Lactobacillus reuteri, Lactobacillus johnsonii, Lactobacillus helveticus, Lactobacillus brevis, Lactobacillus rhamnosus*); Lactococci (for example *Lactococcus lactis*, typically *Lactococcus lactis* subsp. *lactis* or *Lactococcus lactis* subsp. *cremoris*). Preferably the inoculum mixture further comprises *Lactobacillus* and/or *Streptococcus*. For the preparation of yogurt, the inoculum mixture typically comprises *Lactobacillus bulgaricus* (also referred to as *Lactobacillus delbrueckii* subsp. *bulgaricus*) and *Streptococcus thermophilus*, optionally with additional microorganisms such as but not limited to probiotic species or other species that may provide desirable organoleptic or other qualities to the composition, e.g. *Lactococcus lactis*.

Accordingly in one embodiment the present invention provides an inoculum mixture comprising a *Streptococcus thermophilus* CNCM I-5448 inoculum and further comprising at least one inoculum of *Lactobacillus bulgaricus* and optionally one or more additional inoculum of *Lactococcus lactis* and/or *Bifidobacterium*.

Methods for the Preparation of Fermented Dairy Products

The *S. thermophilus* strains of the invention are suitable for use in the preparation of fermented dairy products. Accordingly, an aspect of the present invention also relates to the intended use of these strains, in particular of *Streptococcus thermophilus* CNCM I-5448, for the preparation of a food composition, more particularly for fermenting a food product.

The present invention also provides a process for the preparation of a fermented dairy product comprising inoculating a milk-based composition with a *S. thermophilus* strain as defined above and fermenting.

Accordingly, in one embodiment the present invention provides a process comprising the following steps:
i) providing a mixture comprising:
a) milk, and
b) a *S. thermophilus* strain or inoculum as defined above,
ii) fermenting said mixture to provide a fermented dairy product.

In an embodiment, the mixture further comprises sucrose. In a preferred embodiment, the mixture comprises at least 1, 2, 3, 4, 5, 10 or 20% w/w of sucrose, preferably 1-15% w/w, more preferably 2-10% w/w. It is particularly preferred that the sucrose content in the fermented dairy product obtained at step ii) is at least 90% or more, preferably at least 91%, 92% or 93% of the sucrose content in the mixture of step i). It is preferred that said sucrose content is measured after 7 days storage at 4° C.

Preferably, fermented dairy products are prepared using milk that has been subjected to heat treatment at least equivalent to pasteurization. Preferably, said heat treatment is carried out prior to the preparation of the composition.

Typically, milk is pasteurized by means of the following successive steps:
1) standardization of fatty substances of the raw material so as to obtain a standardized substance,
2) enrichment with dried matter of the standardized substance obtained in the preceding stage, so as to obtain an enriched substance,
3) preheating of the enriched substance obtained in the preceding stage, so as to obtain a starting substance,
4) pasteurization and holding of the starting substance obtained in the preceding stage, so as to obtain a pasteurized and held substance,
5) an optional stage of homogenization of the pasteurized and held substance obtained in the preceding stage, so as to obtain a pasteurized, held and optionally homogenized substance,
6) initial cooling of the pasteurized, held and optionally homogenized substance obtained in the preceding stage, so as to obtain a pasteurized starting substance that has been held, optionally homogenized, and cooled down.

As used herein "standardization of fatty substances" is taken to mean a stage of bringing the quantity of fats present in the starting substance to a pre-determined level. Enrichment with dried matter involves the addition of proteins and fatty substance in order to modify curd firmness.

As used herein "holding" is taken to mean a rapid heating and maintenance of temperature of the milk and makes it possible to destroy the vegetative microbial flora, including pathogenic forms. Its typical duration is from 4 to 10 minutes, in particular from 5 to 8 minutes, and in particular approximately 6 minutes.

As used herein "homogenization" is taken to mean the dispersion of the fatty substances in the milk-type substance into small fat globules. The homogenization is carried out for example at a pressure of 100 to 280 bars, in particular 100 to 250 bars, in particular 100 to 200 bars, in particular approximately 200 bars. This homogenization stage is purely optional. It is in particular absent from the production process of products with 0% fatty substances.

Typically a fermented dairy product is prepared by culture of milks at a suitable temperature with suitable microorganisms to provide a reduction in pH, preferably to a pH equal to or lower than 5, preferably between about 3 and 4.7; more preferably between about 3.5 and about 4.7. The pH can be adjusted by controlling the fermentation by the microorganism and stopping it when appropriate, for example by cooling.

According to an embodiment of the process for the preparation of a fermented dairy product as defined above, the mixture comprising milk and a *S. thermophilus* of the invention further comprises at least one, two, three or more strains of *Bifidobacterium* and/or lactic acid bacteria. The selection of suitable *Bifidobacterium* strains is within the scope of the skilled person and is typically a probiotic lactic acid bacteria. Examples of *Bifidobacterium* that can be used include but are not limited to *Bifidobacterium animalis* (for example *Bifidobacterium animalis* subsp. *animalis* or *Bifidobacterium animalis* subsp. *lactis*); *Bifidobacterium longum*; *Bifidobacterium breve*; *Bifidobacterium bifidum*.

The selection of suitable lactic acid bacteria strains is within the scope of the skilled person and is typically a thermophillic lactic acid bacteria. Examples of lactic acid bacteria that can be used include but are not limited to Lactobacilli (for example *Lactobacillus acidophilus*, *Lactobacillus buchneri*, *Lactobacillus delbruckeii*, in particular *L. delbrueckii* subsp. *bulgaricus* or *lactis*, *Lactobacillus casei*, *Lactobacillus plantarum*, *Lactobacillus reuteri*, *Lactobacillus johnsonii*, *Lactobacillus helveticus*, *Lactobacillus brevis*, *Lactobacillus rhamnosus*); Lactococci (for example *Lactococcus lactis*, typically *Lactococcus lactis* subsp. *lactis* or *Lactococcus lactis* subsp. *cremoris*). Typically a mixture or association of a plurality of species of lactic acid bacteria may be used, typically a mixture or association of *Lactobacillus* and *Streptococcus*. For the preparation of yogurt this typically includes *Lactobacillus bulgaricus* (also referred to as *Lactobacillus delbrueckii* subsp. *bulgaricus*) and *Streptococcus thermophilus*, optionally with additional microorganisms such as but not limited to probiotic species or other species that may provide desirable organoleptic or other qualities to the composition, e.g. *Lactococcus lactis*.

Accordingly, in one embodiment the mixture further comprises at least one strain of *Lactobacillus bulgaricus* and optionally one or more strains of *Lactococcus lactis* and/or *Bifidobacterium*.

Suitable temperatures for milk fermentation are typically about 36° C. to about 44° C. and the temperature is maintained for an incubation time sufficient to provide the desired reduction in pH. For the preparation of a fermented dairy product the temperature at the start of fermentation is typically about 36° C. to about 43° C., in particular about 37° C. to about 40° C., the temperature at the end of fermentation is typically about 37° C. to about 44° C., in particular about 38° C. to about 41° C. The fermentation time is typically about 6 to about 11 hours.

Subsequent to the fermentation the fermented dairy product is cooled. Optionally a stage of intermediate cooling of the fermented milk may be performed to provide a pre-cooled fermented milk having a temperature of between about 22° C. and about 4° C. Typically the intermediate cooling time is about 1 hour to about 4 hours, in particular about 1 hour 30 minutes to about 2 hours. The pre-cooled fermented milk is typically stored for up to 40 hours or less.

Preferably, a stage of final cooling of the fermented milk is performed such that the temperature at the start of the final cooling is less than about 22° C. and the temperature at the end of the final cooling is about 4° C. to about 10° C. The cooled product may then be stored, transported and/or distributed at a temperature from about 1° C. to about 10° C. for at least about 30 days, at least about 60 days or at least about 90 days.

It is particularly preferred that the amount of sucrose in the fermented dairy product is at least 90% or more, preferably at least 91%, 92% or 93% of the sucrose content in the product mixture prior to fermentation. It is preferred that said sucrose is measured after 7 days storage at 4° C. According to a further embodiment, the process for the preparation of a fermented dairy product as defined above optionally comprises a stage of stirring at a pressure of at least 20 bars, or performing a dynamic smoothing, to obtain a composition having the desired viscosity, typically a viscosity of up to 20 mPa·s. Stirring or dynamic smoothing operations provide some shear to composition that typically allow a viscosity drop. Such operations are known by the one skilled in the art, and can be operated with conventional appropriate equipment. This stage is typically performed at cold temperature, for example at a temperature of form 1° C. to 20° C. Without intending to be bound to any theory, it is believed that applying some shear at cold temperature, typically by stirring at high pressure or by performing a dynamic smoothing, can lead to a fluid gel formation within the composition, that provides improved stability even at a low viscosity of up to 20 mPa·s.

Alternatively, according to a further embodiment, the process for the preparation of a fermented dairy product as defined above optionally comprises a stage of acid whey removal to provide a "strained fermented dairy composition". In this step, an acid whey composition is separated from the curd resulting from the protein coagulation due to acidification during fermentation. Thus one obtains:
 a fermented dairy product, typically comprising the proteins coagulum, referred to as a strained fermented dairy composition, and
 an acid whey by-product Such separation steps are known by the one skilled in art, for example in processes of making "greek yogurts". The separation can for example be carried out by reverse osmosis, ultrafiltration, or centrifugal separation. The separation step can be performed for example at a temperature of from 30° C. to 45° C.

According to a further embodiment, the process for the preparation of a fermented dairy product as defined above optionally comprises a stage of addition of an intermediate preparation as described above prior or subsequent to fermentation, said intermediate preparation typically comprising a preparation of fruits and/or cereals and/or additives such as flavorings and/or colourings.

The invention will be further illustrated by the following non-limiting Figures and Examples.

DESCRIPTION OF THE FIGURES

FIG. 7. Comparison of the genomes of the wild type strain and of clone G15. (A) Alignment of the lacS nucleotide sequences. (B) Alignment of the LacS amino acid sequences. (C) Alignment of the intergenic region between galR and galK genes. A point mutation is indicated by a box. Cre site in the galK promoter is underlined.

FIG. 8. Comparison of the genomes of clone G15 and of clone 11. (A) Alignment of the scrA nucleotide sequences. (B) Alignment of the ScrA amino acid sequences. A point mutation is indicated by a box.

FIG. 9. Comparison of the genomes of clone 11 and of clone 11R15 (CNCM I-5448). (A) Alignment of the galR nucleotide sequences. (B) Alignment of the GalR amino acid sequences. A point mutation is indicated by a box.

EXAMPLES

The Inventors aimed to identify a sucrose negative (Suc−) *S. thermophilus* strain suitable for the preparation of fermented dairy products, such as yogurt said strain being sucrose negative (Suc−) to ensure improved sweetness in sugar containing products with minimal post-acidification.

Additionally it was required that said strain have texturizing properties (i.e. producing EPS) and furthermore it was preferred that the strain was fructose negative (Fru−) to ensure that the improved sweetness and reduced post-acidification in products containing fruit.

Accordingly, the Inventors carried out a screening program of 655 *S. thermophilus* strains from the Applicant's Danone Culture Collection. Each strain was analysed using the API 50CH test after 48 hours of incubation at 37° C. with MRS API. This made it possible to determine the fermentation profile for galactose, sucrose and fructose.

Of all the strains tested 654 were Suc+, 13 were Gal+, 84 were Fru+. All Gal+ strains (13) were also Fru+. Of all the strains tested no Suc−Gal+ was identified. The sole Suc− strain identified was Glu+, Fru+, Lac+, Gal−.

I. Selection of a *S. thermophilus* Gal+ Variant

The wild type strain (Wt) shows the phenotype Lac+ Glu+ Suc+ Gal− Fru− and efficiently carries out the fermentation of lactose with high texturizing properties. The wild type strain was successively subcultured in modified M17 medium (M17m, the concentration of beta-glycerophosphate is 9 g/l instead of 19 g/l in M17) in the presence of galactose as the sole carbon source. After 12 subcultures, some clones were isolated on dishes containing M17m galactose. Eight clones (G9 to G16) were isolated and cultured in M17m galactose at 5 g/l.

The growth of the eight selected clones was tested and monitored using a Bioscreen C at a wavelength of 600 nm (Bioscreen C is a spectrophotometer allowing the monitoring of growth by measuring the optical density at 600 nm in microplates) in two different media. Growth was tested in the presence (i) of lactose as the sole source of carbon or (ii) of galactose as the sole source of carbon. The precultures were carried out in M17m gal for the colonies and in M17m lac for the wild type strain. The inoculation rate was 1% from the precultures.

Figure 1:
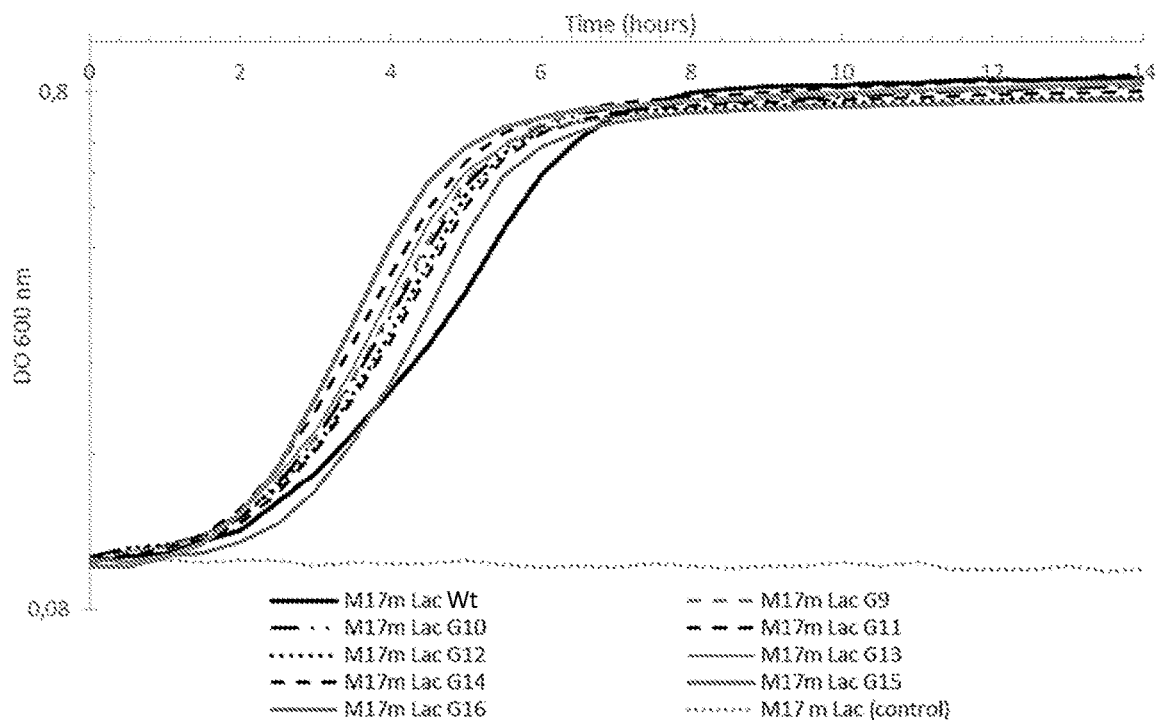
FIG. 1. Growth of wild type strain and Gal+ clones G9 to G16 in M17m with lactose as a sole source of carbon.
Figure 2:
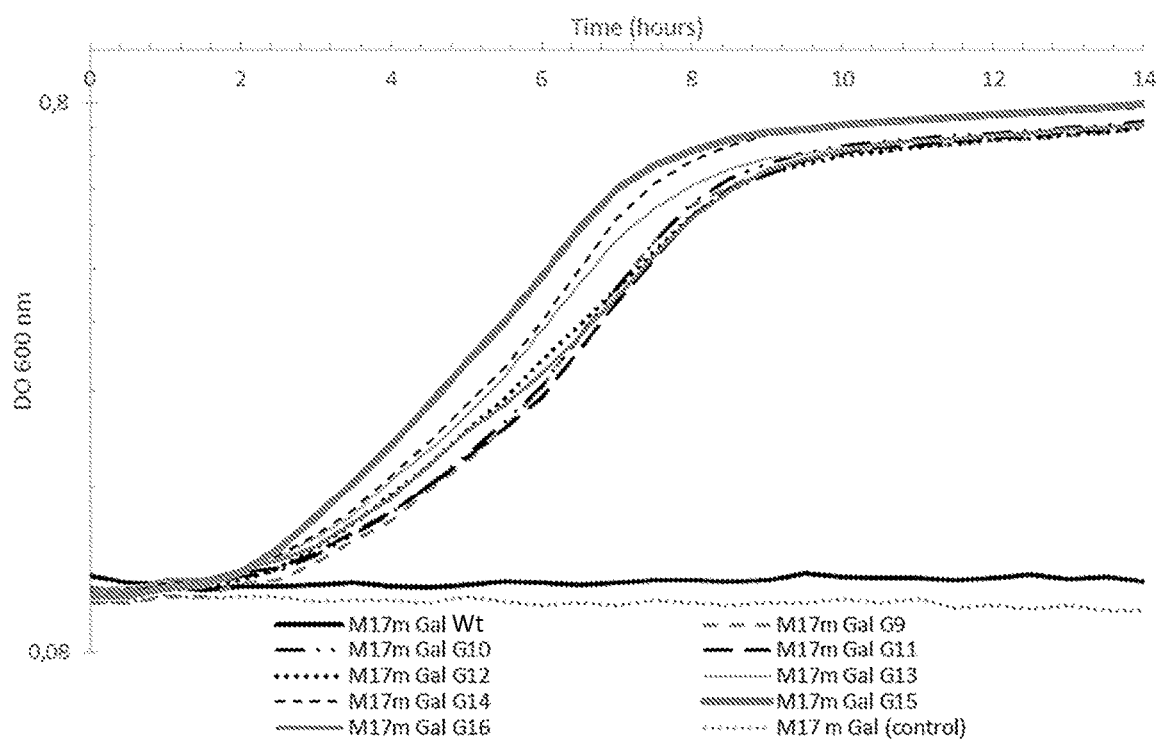
FIG. 2. Growth of wild type strain and Gal+ clones G9 to G16 in M17m with galactose as a sole source of carbon.

The wild type strain and the eight isolated clones efficiently grow in the medium containing lactose (FIG. 1), whereas, in the medium containing galactose, only the eight isolated clones are able to grow (FIG. 2).

These results show the isolation of Gal+ variants from the Gal− wild type strain.

Clone G15 was selected because it showed the best growth in both galactose and lactose.

II. Mutagenesis of the *S. thermophilus* Gal+ Variant

Ultraviolet mutagenesis was performed on the Gal+ clone G15 derived from the wild type strain. For the mutagenesis, a dose of UV giving approximately 2% survival was used.

Four thousand clones obtained from mutagenesis were tested for their capacity to acidify the M17m medium in the presence of galactose at 5 g/l as a carbon source and to acidify the M17m medium in the presence of sucrose at 5 g/l as a source of carbon. Purple bromocresol was used as a pH indicator, which turns yellow in acidic medium while it is purple in a non-inoculated medium.

Thirteen out of 4000 tested clones showed a reduced ability to acidify the medium in the presence of sucrose while maintaining a good acidification in the presence of galactose as a carbon source.

III. Characterization of the *S. thermophilus* Gal+ Mutants with a Deficiency in Sucrose Metabolism 13 clones were tested in semi-skimmed UHT milk supplemented with yeast extract at 2 g/l. The milk enriched with yeast extract was inoculated at 1% from a pre-culture made in semi-skimmed UHT milk enriched with yeast extract at 2 g/l. The cultures were incubated at 38° C. and the fermentation was stopped at pH 4.7 by cooling to 4° C.

Figure 3:
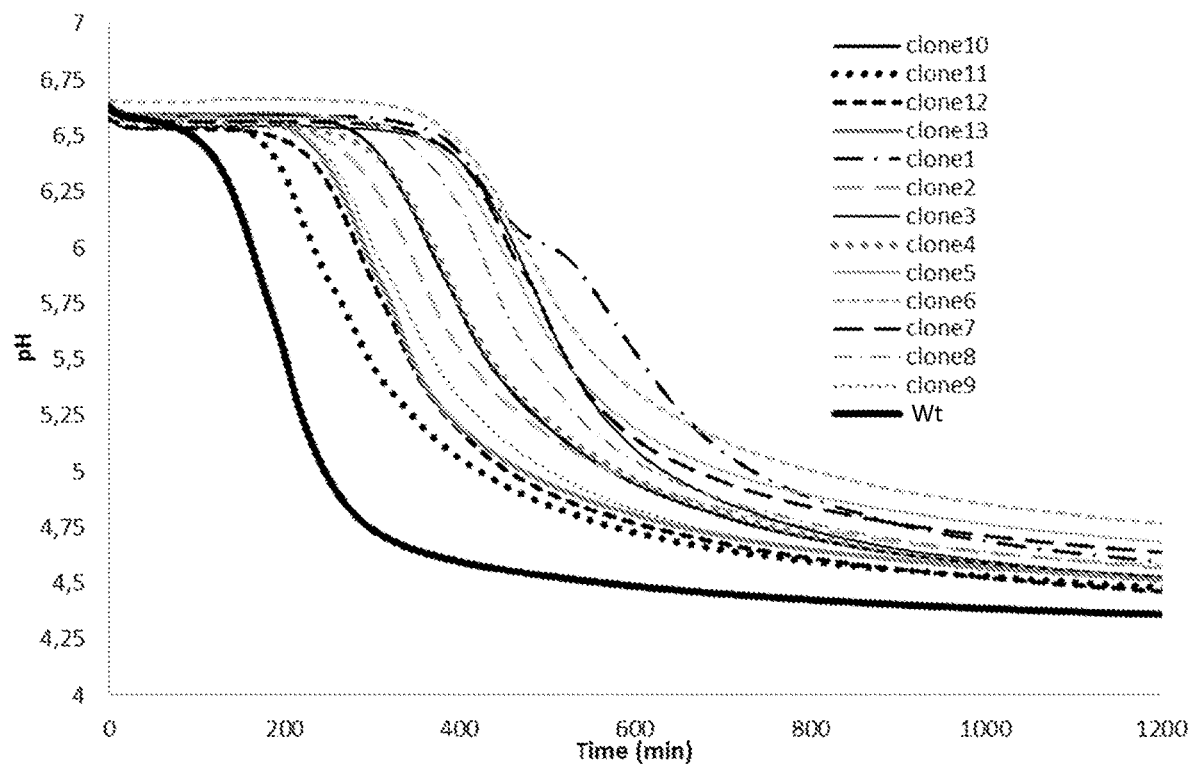
FIG. 3. Fermentation of semi-skimmed UHT milk by the wild type strain or by the sucrose deficient clones 1-13.

The fermentation was monitored by the iCinac system which makes it possible to obtain the pH values continuously. All clones showed a reduced capacity to acidify the milk (FIG. 3).

The ability of the clones to grow in a medium containing sucrose as a carbon source was also evaluated by monitoring the optical density at 600 nm with Bioscreen C.

Growth monitoring was carried out in the presence (i) of lactose as the sole source of carbon or (ii) of sucrose as the sole source of carbon. The precultures were carried out in M17m gal for the colonies and in M17m Lac for the wild type strain. The inoculation rate was 1% from the precultures.

Figure 4:
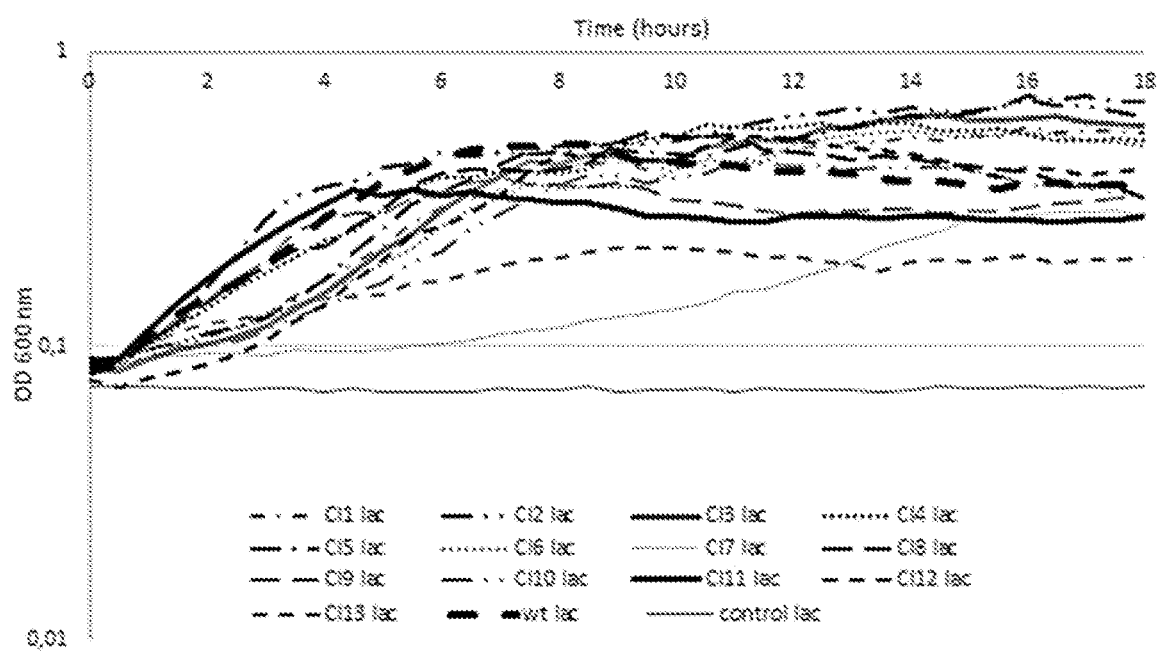
FIG. 4. Growth of wild type strain and sucrose deficient clones 1-13 in M17m with lactose as a sole source of carbon.
Figure 5:
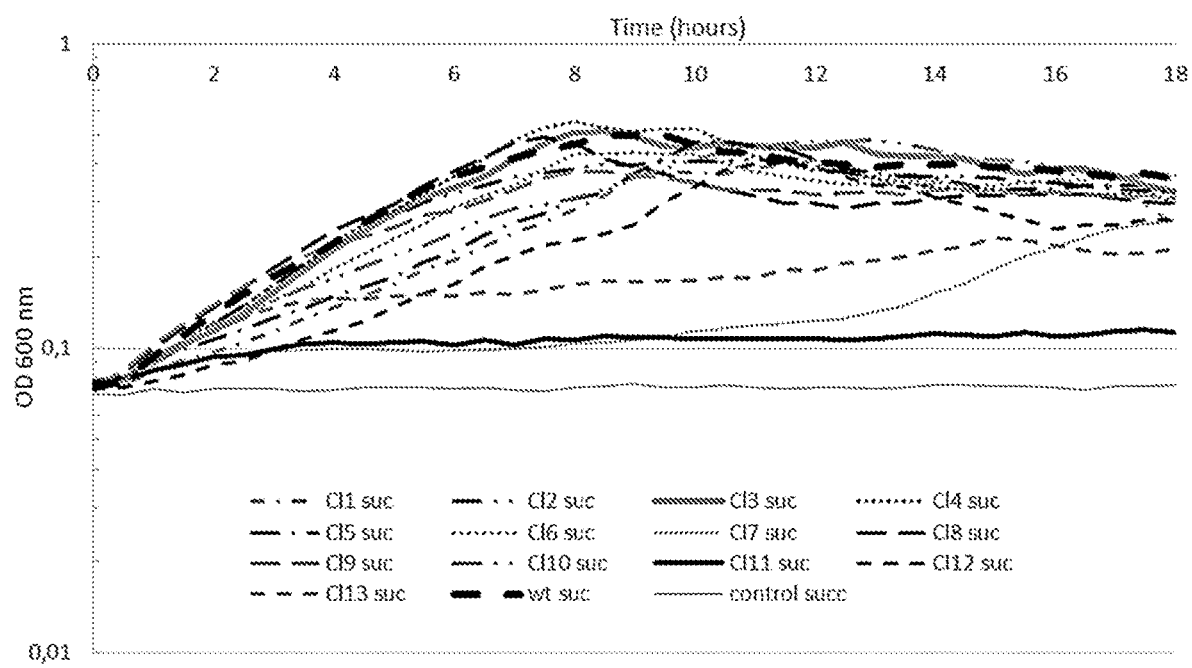
FIG. 5. Growth of wild type strain and sucrose deficient clones 1-13 in M17m with sucrose as a sole source of carbon.

In the presence of lactose, all clones were able to grow (FIG. 4). In the presence of sucrose, most of the clones showed a growth that was reduced as compared to the growth of wild type strain, but only clone 11 showed an inability to grow in the presence of sucrose (FIG. 5).

These results show the successful isolation of a Suc− clone from the Gal+ variant.

IV. Improvement of the Growth of the Gal+ Suc− Strain in Milk.

Clone 11 showed a clear Suc− phenotype, but also showed a reduction of its fermentative efficacy in milk. In order to restore an efficacy similar to the one of the wild type strain, 15 successive subcultures in semi-skimmed UHT milk supplemented with yeast extract at 2 g/l were carried out. Clone 11R15 was obtained and subsequently deposited as strain CNCM I-5448, as described above. The fermentation with the wild type strain, clone 11 or clone 11R15 in UHT semi-skimmed milk with 2 g/l yeast extract was measured by the iCinac system.

Figure 6:
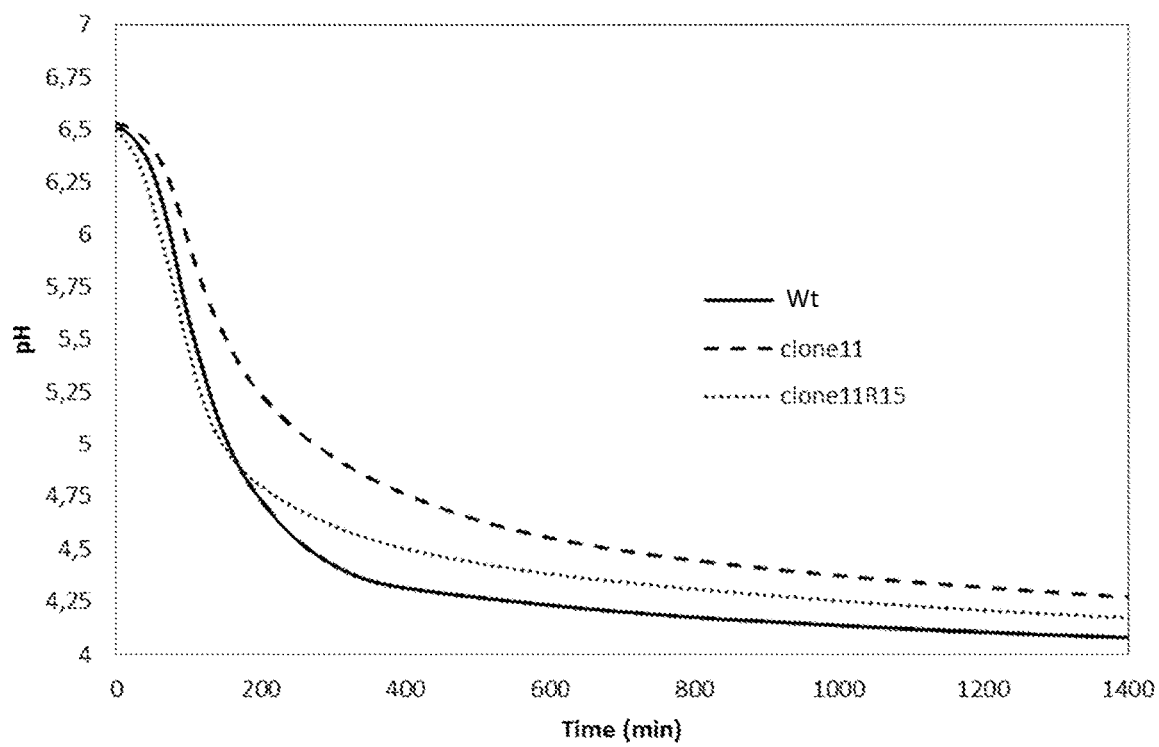
FIG. 6. Fermentation of semi-skimmed UHT milk by the wild type strain, clone 11 or clone 11R15 (CNCM I-5448).

Clone 11R15 (CNCM I-5448) showed a capacity to acidify milk better than that of clone 11 and similar to that of the wild type strain (FIG. 6).

These results show the isolation of a Suc− variant with the same capacity to ferment milk as compared to the wild type strain.

V. Characterization of the Clone 11R15 (CNCM I-5448)

V.1. Dosage of Sucrose

Mixtures were prepared using UHT semi-skimmed milk with 2 g/l yeast extract and 55 g/l sucrose and inoculated with clone 11R15 or with the wild type strain, fermentation was carried out at 38° C. and stopped when the pH was 4.7 by rapid cooling.

As a control an unfermented acidic (pH 4.7) milk product (no strains) was prepared using UHT semi-skimmed milk with 2 g/l yeast extract and 55 g/l sucrose and glucono delta-lactone (GDL) 1.5% w/w as an acidifying agent. Said control product was heated to 38° C. for 4 hours, to ensure comparability to test products.

Products were stored for 7 days at 4° C., then the products were centrifuged at 5000 g for 5 minutes at 4° C. The determination of sucrose in the supernatants was assayed on 3 samples in 2 experiments using a Glucose-Fructose-Sucrose assay kit from Biosentec. The results are given in Table 1.

TABLE 1

Level of sucrose in the products after fermentation with wild type strain or with clone 11R15 (CNCM I-5448).

|  | First experiment | Standard deviation | Second experiment | Standard deviation |
|---|---|---|---|---|
| Wt | 47.7 g/L | 1.77 | 44.1 g/L | 2.36 |
| clone 11R15 (CNCM I-5448) | 52.9 g/L | 2 | 53 g/L | 2.15 |
| GDL 1.5% Control | 55.46 g/L | 1.22 | 52.16 g/L | 1.09 |

In the first experiment, the product fermented with the wild type strain has lost 7.3±1.8 g whereas the product fermented with the clone 11R15 has lost only 2.1±1.8 g. In the second experiment, the product fermented with the wild type strain has lost 10.9±2 g whereas the product fermented with the clone 11R15 has lost only 2±2.1 g.

These results show that clone 11R15 (CNCM I-5448) is able to achieve fermentation while significantly maintaining the level of sucrose in the ingredients, contrary to the wild type strain. The slight reduction in sucrose during fermentation can reasonably be attributed to the inherent degradation of sucrose in the acidic pH, as it is comparable to that of the GDL control in the second experiment.

V.2. Viscosity

Mixtures were prepared using UHT semi-skimmed milk with 2 g/l yeast extract and 55 g/l sucrose and inoculated with clone 11R15, with clone 11 or with wild type strain. fermentation was carried out at 38° C. and stopped when the pH was 4.7 by rapid cooling. Products were stored for 7 days at 4° C., then the viscosity was measured by shear stress measurement.

This method consists of determining the viscosity of products, after manual stirring and incubation for 30 minutes at 4° C. Three measurements were carried out at 4° C. on three pots of milk fermented by the same strain and under the same conditions. The apparatus used for this analysis was a refrigerated MCR301 rheometer equipped with a 27 mm concentric cylinder system. This rotating system makes it possible to observe a destructurisation of the product as a function of a linear shear gradient, i.e. a stress at a given gradient. The results are obtained in the form of a continuous flow curve, rising and falling ramp between 0 and 20 s−1. The product undergoes an increasing shear gradient from 0 to 20 s−1 for 1 minute. This phase corresponds to the rising ramp. Then, it undergoes a decreasing shear gradient from 20 to 0 s−1 for 1 minute, corresponding to the downward ramp.

Each downward curve is then modeled according to the Casson model (equation I).

$$\sqrt{\tau} = \sqrt{\tau_0} + \sqrt{\eta \times D} \quad (1)$$

τ: Stress (Pa)
$\tau_0$: Yield point of the product (Pa)
η: Viscosity of the product (Pa·s)
D: Shear gradient (s−1)

Viscosity of the products after 7 days of storage at 4° C. are given in Table 2.

TABLE 2

Viscosity the products fermented with wild type strain, with clone 11 or with clone 11R15.

|  | Viscosity | Standard deviation |
|---|---|---|
| Wt | 1116 mPa · s | 76 |
| clone 11 | 557 mPa · s | 36 |
| clone 11R15 | 1143 mPa · s | 42 |

These results show that clone 11R15 (CNCM I-5448) has similar texturizing properties as compared to the wild type strain.

V.3. API (Analytical Profile Index) Test

The fermentation profile of the clone 11R15 (CNCM I-5448) was obtained by carrying out the API 50CH test after 48 hours of incubation at 37° C. with MRS API. This made it possible to determine the fermentation profile for galactose, sucrose and fructose.

Clone 11R15 (CNCM I-5448) is galactose positive (Gal+), sucrose negative (Suc−), fructose negative (Fru−), lactose positive (Lac+), glucose positive (Glu+) as determined using said test and furthermore is highly fermentative and texturizing (significantly EPS producing).

VI. Genomic Comparisons of the *S. thermophilus* Variants

The complete genomes of the *S. thermophilus* wild strain and of its variants, i.e. clone G15, clone 11 and clone 11R15, were sequenced by NGS using Illumina NovaSeq6000 system.

The genomic sequences of all variants were compared to each other in order to identify the mutations associated to specific phenotypes which appeared step by step to the isolation of clone 11R15 (CNCM I-5448).

VI.1. Gal+ Phenotype

The comparison of the genome of the wild type strain with the genome of clone G15 showed that a mutation in the lacS gene and a mutation in the intergenic region between galR and galK were associated with the Gal+ phenotype.

In particular, the Inventors noted a substitution C/A in the lacS gene in position 1159 of SEQ ID NO: 1 (FIG. 7A), which results in a replacement of a Proline by a Threonine in position 387 of the LacS protein of SEQ ID NO: 3 (FIG. 7B), and a substitution G/T in galK promoter in position 228 of SEQ ID NO: 5 (FIG. 7C).

VI.2. Suc− Phenotype

The comparison of the genome of clone G15 with the genome of clone 11 showed that a non-sense mutation in the scrA gene was associated with the Suc− phenotype.

In particular, the Inventors noted a non-sense substitution C/T in the scrA gene in position 1393 of SEQ ID NO: 7 (FIG. 8A), which results in a stop in the ScrA protein in position 465 of SEQ ID NO: 9 (FIG. 8B).

VI.2. Rapid Growth in Milk

The comparison of the genome of clone 11 with the genome of clone 11R15 (CNCM I-5448) showed that a mutation in the galR gene was associated with the improvement of the growth of the strain in milk.

In particular, the Inventors noted a substitution T/C in the galR gene in position 281 of SEQ ID NO: 11 (FIG. 9A), which results in a replacement of a Leucine by a Proline in the GalR protein in position 94 of SEQ ID NO: 13 (FIG. 9B).

The mutations are summarized in order of appearance in Table 3.

TABLE 3

Summary of the step-by-step mutations between *S. thermophilus* variants.

| Mutation | Wild type strain | Clone G15 Gal+ | Clone 11 Gal+ Suc− | Clone 11R15 (CNCM I-5448) Gal+ Suc− Rapid growth in milk |
|---|---|---|---|---|
| lacS Substitution C/A (P→T) | No | yes | yes | yes |
| Intergenic region between galR and galK Substitution G/T in galK promoter (cre site) | No | yes | yes | yes |
| scrA Substitution C/T (Non-sense mutation) | No | No | yes | yes |
| galR Substitution T/C (L→P) | No | No | No | yes |

The invention claimed is:

1. A mutant *Streptococcus thermophilus* strain that it is galactose positive and sucrose negative.

2. The mutant strain of claim 1, wherein the strain is a texturizing strain.

3. The mutant strain of claim 1, wherein the strain is glucose positive.

4. The mutant strain of claim 1, wherein the mutant strain has been deposited at the CNCM under reference number CNCM I-5448.

5. A composition comprising the mutant strain of claim 1.

6. The composition according to claim 5, wherein the composition comprises at least $10^5$ CFU/g of said mutant strain.

7. The composition of claim 5, wherein said composition is a food product.

8. The composition of claim 7, wherein said food product is a dairy product or a dairy alternative.

9. A method for preparing a fermented food product comprising:
   i) providing a mixture comprising:
      a) milk, and
      b) at least one *S. thermophilus* strain of claim 1, and
   ii) fermenting said mixture to provide a fermented food product.

10. The composition of claim 5, wherein the composition has a viscosity of at least 800 mPa·s.

11. The composition of claim 5, wherein the composition has a pH of 4.7 or lower.

12. The composition of claim 5, further comprising at least one strain of *Bifidobacterium* or lactic acid bacteria.

13. A method for obtaining a *S. thermophilus* strain according to claim 1, comprising:
   i) providing a first *S. thermophilus* strain,
   ii) selecting at least one galactose positive clone thereof, and
   iii) mutating said selected clone(s) selected in ii), and selecting at least one sucrose negative variant thereof.

14. The method of claim 13, further comprising:
   iv) selecting a sucrose negative variant that is the most fermentative in a milk based medium and/or subculturing a sucrose negative variant in a milk based medium.

15. The method of claim 9, wherein the fermented food product has a viscosity of at least 800 mPa·s.

16. The method of claim 9, wherein the fermented food product has a pH of 4.7 or lower.

17. The method of claim 9, further comprising providing at least one strain of *Bifidobacterium* or lactic acid bacteria to the mixture.

18. The method of claim 13, wherein said mutating is performed by means of chemical and/or radiation.

19. The composition of claim 7, wherein the food product is a fermented food product.

20. The composition of claim 19, wherein the fermented food product is yogurt, kefir, buttermilk, quark, sour cream, or cheese.

* * * * *

SEQUENCE LISTING

<160> NUMBER OF SEQ ID NOS: 15

<210> SEQ ID NO 1
<211> LENGTH: 1905
<212> TYPE: DNA
<213> ORGANISM: Streptococcus thermophilus wild type

<400> SEQUENCE: 1

```
atggaaaaat ctaaaggtca gatgaagtct cgtttatcct acgcagctgg tgcttttggt      60
aacgacgtct tctatgcaac cttgtcaaca tactttatca tgtttgtgac aactcacttg     120
tttaacacag gtgatccaaa gcaaaatagt cactacgtac tattaatcac taacattatc     180
tctattttgc gtatcttgga agtatttatc gatccattga tcggtaatat gattgataac     240
actaatacta agtatggtaa attcaaacca tgggtagttg gtggtggtat catcagttct     300
atcaccttgt tgcttctctt caccgattta ggtggtttga ataaaacaaa tcctttcttg     360
taccttgtac tttttggaat tatctacctt gtaatggatg tcttctactc gattaaagat     420
atcggtttct ggtcaatgat tcctgccttg tctcttgata gtcacgaacg tgaaaaaatg     480
gcaacttttg cccgtattgg ttctacgatt ggtgccaata ttgtaggtgt tgccatcatg     540
ccaatcgttt tgttcttctc tatgacgaac aatagtggct ctggagataa atctggatgg     600
ttctggtttg catttatcgt tgctctcatt ggtgtgatta tcaattgc tgttggtatt     660 ggtacacgtg aagttgagtc aaaaattcgt gataataacg aaaaaactag ccttaaacaa     720
gtctttaagg ttcttggtca aaacgaccaa ttgatgtggt tatctcttgg atattggttc     780
tatggtcttg gtattaatac acttaatact cttcaacttt attatttcac atttatcctt     840
ggtgattcag gtaaatactc aattctttac ggattgaata cagttgttgg tttggtttca     900
gtttcactct ccctaccct agctgataaa ttcaaccgta acgtttgtt ctacggatgt     960 attgcagtaa tgctcggggg tatcggaata tttagtattg caggtacatc acttccaata    1020
atcttgactg cagctgaact cttcttcatt ccacaacctc ttgtgttcct tgttgtcttt    1080
atgattatct ctgactcagt agaatatggt caatggaaaa cgggacaccg tgatgaatca    1140
cttactttgt cagttcgtcc acttattgat aaacttggtg gtgcgatgtc aaactggctt    1200
gtttctacat ttgccatagc tgccggtatg acaacaggtg cctcagcatc aacaattaca    1260
acacatcaac agtttatctt taagcttggc atgtttgctt tcccagcagc aacaatgctt    1320
atcggtgcct tcattgttgc tcgtaaaatc actttgactg aagcacgtca cgctaaaatt    1380
gttgaagaat tggaacatcg ctttagcgta gcaacttctg aaaatgaagt taaagctaac    1440
```

| | |
|---|---|
| gtcgtatctc ttgtaacccc tacaactggt tatttggttg atctctcaag tgttaatgat | 1500 |
| gaacactttg cttcaggtag catgggtaaa ggtttcgcca ttaaacctac tgatggagct | 1560 |
| gtctttgcac caattagtgg taccattcgt caaattcttc ctactcgcca tgcagttggt | 1620 |
| attgaaagtg aagatggtgt cattgttctt atccacgttg gcatcggaac agttaaactt | 1680 |
| aatggtgaag gattcattag ttacgtagaa caaggtgatc atgttgaagt tggacaaaaa | 1740 |
| cttcttgagt tctggtcacc aattattgag aaaaatggtc ttgatgacac agtacttgtc | 1800 |
| actgtaacta attcagaaaa attcagtgct ttccatcttg aacaaaaagt tggagaaaag | 1860 |
| gtagaagctt tgtctgaagt tattaccttc aaaaaaggag aataa | 1905 |

<210> SEQ ID NO 2
<211> LENGTH: 1905
<212> TYPE: DNA
<213> ORGANISM: Streptococcus thermophilus G15

<400> SEQUENCE: 2

| | |
|---|---|
| atggaaaaat ctaaaggtca gatgaagtct cgtttatcct acgcagctgg tgcttttggt | 60 |
| aacgacgtct tctatgcaac cttgtcaaca tactttatca tgtttgtgac aactcacttg | 120 |
| tttaacacag gtgatccaaa gcaaatagt cactacgtac tattaatcac taacattatc | 180 |
| tctattttgc gtatcttgga agtatttatc gatccattga tcggtaatat gattgataac | 240 |
| actaatacta gtatggtaa attcaaacca tgggtagttg gtggtggtat catcagttct | 300 |
| atcaccttgt tgcttctctt caccgattta ggtggtttga ataaaacaaa tcctttcttg | 360 |
| taccttgtac tttttggaat tatctacctt gtaatggatg tcttctactc gattaaagat | 420 |
| atcggtttct ggtcaatgat tcctgccttg tctcttgata gtcacgaacg tgaaaaaatg | 480 |
| gcaacttttg cccgtattgg ttctacgatt ggtgccaata ttgtaggtgt tgccatcatg | 540 |
| ccaatcgttt tgttcttctc tatgacgaac aatagtggct ctggagataa atctggatgg | 600 |
| ttctggtttg catttatcgt tgctctcatt ggtgtgatta catcaattgc tgttggtatt | 660 |
| ggtacacgtg aagttgagtc aaaaattcgt gataataacg aaaaaactag ccttaaacaa | 720 |
| gtctttaagg ttcttggtca aaacgaccaa ttgatgtggt tatctcttgg atattggttc | 780 |
| tatggtcttg gtattaatac acttaatact cttcaacttt attatttcac atttatcctt | 840 |
| ggtgattcag gtaaatactc aattctttac ggattgaata cagttgttgg tttggtttca | 900 |
| gtttcactct tccctaccct agctgataaa ttcaaccgta acgtttgtt ctacggatgt | 960 |
| attgcagtaa tgctcggggg tatcggaata tttagtattg caggtacatc acttccaata | 1020 |
| atcttgactg cagctgaact cttcttcatt ccacaacctc ttgtgttcct tgttgtcttt | 1080 |
| atgattatct ctgactcagt agaatatggt caatggaaaa cgggacaccg tgatgaatca | 1140 |
| cttactttgt cagttcgtac acttattgat aaacttggtg gtgcgatgtc aaactggctt | 1200 |
| gtttctacat ttgccatagc tgccggtatg acaacaggtg cctcagcatc aacaattaca | 1260 |
| acacatcaac agtttatctt taagcttggc atgtttgctt tcccagcagc aacaatgctt | 1320 |
| atcggtgcct tcattgttgc tcgtaaaatc actttgactg aagcacgtca cgctaaaatt | 1380 |
| gttgaagaat tggaacatcg ctttagcgta gcaacttctg aaaatgaagt taaagctaac | 1440 |
| gtcgtatctc ttgtaaccccc tacaactggt tatttggttg atctctcaag tgttaatgat | 1500 |
| gaacactttg cttcaggtag catgggtaaa ggtttcgcca ttaaacctac tgatggagct | 1560 |
| gtctttgcac caattagtgg taccattcgt caaattcttc ctactcgcca tgcagttggt | 1620 |
| attgaaagtg aagatggtgt cattgttctt atccacgttg gcatcggaac agttaaactt | 1680 |

-continued

```
aatggtgaag gattcattag ttacgtagaa caaggtgatc atgttgaagt tggacaaaaa    1740
cttcttgagt tctggtcacc aattattgag aaaaatggtc ttgatgacac agtacttgtc    1800
actgtaacta attcagaaaa attcagtgct ttccatcttg aacaaaaagt tggagaaaag    1860
gtagaagctt tgtctgaagt tattaccttc aaaaaaggag aataa                    1905
```

<210> SEQ ID NO 3
<211> LENGTH: 634
<212> TYPE: PRT
<213> ORGANISM: Streptococcus thermophilus wild type

<400> SEQUENCE: 3

```
Met Glu Lys Ser Lys Gly Gln Met Lys Ser Arg Leu Ser Tyr Ala Ala
1               5                   10                  15

Gly Ala Phe Gly Asn Asp Val Phe Tyr Ala Thr Leu Ser Thr Tyr Phe
            20                  25                  30

Ile Met Phe Val Thr Thr His Leu Phe Asn Thr Gly Asp Pro Lys Gln
        35                  40                  45

Asn Ser His Tyr Val Leu Leu Ile Thr Asn Ile Ile Ser Ile Leu Arg
    50                  55                  60

Ile Leu Glu Val Phe Ile Asp Pro Leu Ile Gly Asn Met Ile Asp Asn
65                  70                  75                  80

Thr Asn Thr Lys Tyr Gly Lys Phe Lys Pro Trp Val Val Gly Gly Gly
                85                  90                  95

Ile Ile Ser Ser Ile Thr Leu Leu Leu Phe Thr Asp Leu Gly Gly
            100                 105                 110

Leu Asn Lys Thr Asn Pro Phe Leu Tyr Leu Val Leu Phe Gly Ile Ile
        115                 120                 125

Tyr Leu Val Met Asp Val Phe Tyr Ser Ile Lys Asp Ile Gly Phe Trp
    130                 135                 140

Ser Met Ile Pro Ala Leu Ser Leu Asp Ser His Glu Arg Glu Lys Met
145                 150                 155                 160

Ala Thr Phe Ala Arg Ile Gly Ser Thr Ile Gly Ala Asn Ile Val Gly
                165                 170                 175

Val Ala Ile Met Pro Ile Val Leu Phe Phe Ser Met Thr Asn Asn Ser
            180                 185                 190

Gly Ser Gly Asp Lys Ser Gly Trp Phe Trp Phe Ala Phe Ile Val Ala
        195                 200                 205

Leu Ile Gly Val Ile Thr Ser Ile Ala Val Gly Ile Gly Thr Arg Glu
    210                 215                 220

Val Glu Ser Lys Ile Arg Asp Asn Asn Glu Lys Thr Ser Leu Lys Gln
225                 230                 235                 240

Val Phe Lys Val Leu Gly Gln Asn Asp Gln Leu Met Trp Leu Ser Leu
                245                 250                 255

Gly Tyr Trp Phe Tyr Gly Leu Gly Ile Asn Thr Leu Asn Thr Leu Gln
            260                 265                 270

Leu Tyr Tyr Phe Thr Phe Ile Leu Gly Asp Ser Gly Lys Tyr Ser Ile
        275                 280                 285

Leu Tyr Gly Leu Asn Thr Val Val Gly Leu Val Ser Val Ser Leu Phe
    290                 295                 300

Pro Thr Leu Ala Asp Lys Phe Asn Arg Lys Arg Leu Phe Tyr Gly Cys
305                 310                 315                 320

Ile Ala Val Met Leu Gly Gly Ile Gly Ile Phe Ser Ile Ala Gly Thr
                325                 330                 335
```

Ser Leu Pro Ile Ile Leu Thr Ala Ala Glu Leu Phe Ile Pro Gln
        340                 345                 350

Pro Leu Val Phe Leu Val Val Phe Met Ile Ile Ser Asp Ser Val Glu
            355                 360                 365

Tyr Gly Gln Trp Lys Thr Gly His Arg Asp Glu Ser Leu Thr Leu Ser
370                 375                 380

Val Arg Pro Leu Ile Asp Lys Leu Gly Gly Ala Met Ser Asn Trp Leu
385                 390                 395                 400

Val Ser Thr Phe Ala Ile Ala Ala Gly Met Thr Thr Gly Ala Ser Ala
                405                 410                 415

Ser Thr Ile Thr Thr His Gln Gln Phe Ile Phe Lys Leu Gly Met Phe
            420                 425                 430

Ala Phe Pro Ala Ala Thr Met Leu Ile Gly Ala Phe Ile Val Ala Arg
            435                 440                 445

Lys Ile Thr Leu Thr Glu Ala Arg His Ala Lys Ile Val Glu Glu Leu
        450                 455                 460

Glu His Arg Phe Ser Val Ala Thr Ser Glu Asn Glu Val Lys Ala Asn
465                 470                 475                 480

Val Val Ser Leu Val Thr Pro Thr Thr Gly Tyr Leu Val Asp Leu Ser
                485                 490                 495

Ser Val Asn Asp Glu His Phe Ala Ser Gly Ser Met Gly Lys Gly Phe
            500                 505                 510

Ala Ile Lys Pro Thr Asp Gly Ala Val Phe Ala Pro Ile Ser Gly Thr
        515                 520                 525

Ile Arg Gln Ile Leu Pro Thr Arg His Ala Val Gly Ile Glu Ser Glu
530                 535                 540

Asp Gly Val Ile Val Leu Ile His Val Gly Ile Gly Thr Val Lys Leu
545                 550                 555                 560

Asn Gly Glu Gly Phe Ile Ser Tyr Val Glu Gln Gly Asp His Val Glu
                565                 570                 575

Val Gly Gln Lys Leu Leu Glu Phe Trp Ser Pro Ile Ile Glu Lys Asn
            580                 585                 590

Gly Leu Asp Asp Thr Val Leu Val Thr Val Thr Asn Ser Glu Lys Phe
        595                 600                 605

Ser Ala Phe His Leu Glu Gln Lys Val Gly Lys Val Glu Ala Leu
            610                 615                 620

Ser Glu Val Ile Thr Phe Lys Lys Gly Glu
625                 630

<210> SEQ ID NO 4
<211> LENGTH: 634
<212> TYPE: PRT
<213> ORGANISM: Streptococcus thermophilus G15

<400> SEQUENCE: 4

Met Glu Lys Ser Lys Gly Gln Met Lys Ser Arg Leu Ser Tyr Ala Ala
1               5                   10                  15

Gly Ala Phe Gly Asn Asp Val Phe Tyr Ala Thr Leu Ser Thr Tyr Phe
            20                  25                  30

Ile Met Phe Val Thr Thr His Leu Phe Asn Thr Gly Asp Pro Lys Gln
        35                  40                  45

Asn Ser His Tyr Val Leu Leu Ile Thr Asn Ile Ile Ser Ile Leu Arg
    50                  55                  60

Ile Leu Glu Val Phe Ile Asp Pro Leu Ile Gly Asn Met Ile Asp Asn

-continued

```
            65                  70                  75                  80
Thr Asn Thr Lys Tyr Gly Lys Phe Lys Pro Trp Val Gly Gly
                    85                  90                  95
Ile Ile Ser Ser Ile Thr Leu Leu Leu Phe Thr Asp Leu Gly Gly
                    100                 105                 110
Leu Asn Lys Thr Asn Pro Phe Leu Tyr Leu Val Leu Phe Gly Ile Ile
                    115                 120                 125
Tyr Leu Val Met Asp Val Phe Tyr Ser Ile Lys Asp Ile Gly Phe Trp
            130                 135                 140
Ser Met Ile Pro Ala Leu Ser Leu Asp Ser His Glu Arg Glu Lys Met
145                 150                 155                 160
Ala Thr Phe Ala Arg Ile Gly Ser Thr Ile Gly Ala Asn Ile Val Gly
                    165                 170                 175
Val Ala Ile Met Pro Ile Val Leu Phe Phe Ser Met Thr Asn Asn Ser
                    180                 185                 190
Gly Ser Gly Asp Lys Ser Gly Trp Phe Trp Phe Ala Phe Ile Val Ala
                    195                 200                 205
Leu Ile Gly Val Ile Thr Ser Ile Ala Val Gly Ile Gly Thr Arg Glu
            210                 215                 220
Val Glu Ser Lys Ile Arg Asp Asn Asn Glu Lys Thr Ser Leu Lys Gln
225                 230                 235                 240
Val Phe Lys Val Leu Gly Gln Asn Asp Gln Leu Met Trp Leu Ser Leu
                    245                 250                 255
Gly Tyr Trp Phe Tyr Gly Leu Gly Ile Asn Thr Leu Asn Thr Leu Gln
                    260                 265                 270
Leu Tyr Tyr Phe Thr Phe Ile Leu Gly Asp Ser Gly Lys Tyr Ser Ile
            275                 280                 285
Leu Tyr Gly Leu Asn Thr Val Val Gly Leu Val Ser Val Ser Leu Phe
            290                 295                 300
Pro Thr Leu Ala Asp Lys Phe Asn Arg Lys Arg Leu Phe Tyr Gly Cys
305                 310                 315                 320
Ile Ala Val Met Leu Gly Gly Ile Gly Ile Phe Ser Ile Ala Gly Thr
                    325                 330                 335
Ser Leu Pro Ile Ile Leu Thr Ala Ala Glu Leu Phe Phe Ile Pro Gln
                    340                 345                 350
Pro Leu Val Phe Leu Val Val Phe Met Ile Ile Ser Asp Ser Val Glu
                    355                 360                 365
Tyr Gly Gln Trp Lys Thr Gly His Arg Asp Glu Ser Leu Thr Leu Ser
            370                 375                 380
Val Arg Thr Leu Ile Asp Lys Leu Gly Gly Ala Met Ser Asn Trp Leu
385                 390                 395                 400
Val Ser Thr Phe Ala Ile Ala Ala Gly Met Thr Thr Gly Ala Ser Ala
                    405                 410                 415
Ser Thr Ile Thr Thr His Gln Gln Phe Ile Phe Lys Leu Gly Met Phe
                    420                 425                 430
Ala Phe Pro Ala Ala Thr Met Leu Ile Gly Ala Phe Ile Val Ala Arg
            435                 440                 445
Lys Ile Thr Leu Thr Glu Ala Arg His Ala Lys Ile Val Glu Glu Leu
            450                 455                 460
Glu His Arg Phe Ser Val Ala Thr Ser Glu Asn Glu Val Lys Ala Asn
465                 470                 475                 480
Val Val Ser Leu Val Thr Pro Thr Thr Gly Tyr Leu Val Asp Leu Ser
                    485                 490                 495
```

Ser Val Asn Asp Glu His Phe Ala Ser Gly Ser Met Gly Lys Gly Phe
            500                 505                 510

Ala Ile Lys Pro Thr Asp Gly Ala Val Phe Ala Pro Ile Ser Gly Thr
        515                 520                 525

Ile Arg Gln Ile Leu Pro Thr Arg His Ala Val Gly Ile Glu Ser Glu
    530                 535                 540

Asp Gly Val Ile Val Leu Ile His Val Gly Ile Gly Thr Val Lys Leu
545                 550                 555                 560

Asn Gly Glu Gly Phe Ile Ser Tyr Val Glu Gln Gly Asp His Val Glu
                565                 570                 575

Val Gly Gln Lys Leu Leu Glu Phe Trp Ser Pro Ile Ile Glu Lys Asn
            580                 585                 590

Gly Leu Asp Asp Thr Val Leu Val Thr Val Thr Asn Ser Glu Lys Phe
        595                 600                 605

Ser Ala Phe His Leu Glu Gln Lys Val Gly Lys Val Glu Ala Leu
    610                 615                 620

Ser Glu Val Ile Thr Phe Lys Lys Gly Glu
625                 630

<210> SEQ ID NO 5
<211> LENGTH: 300
<212> TYPE: DNA
<213> ORGANISM: Streptococcus thermophilus wild type

<400> SEQUENCE: 5
tcatcagcga tagttaatat ccgatgtcta gtatcctctg ttacggaaag agtttcatct      60
ttattaagaa cacgtgaaac agttgaaata gatacacctg ctaattttgc gatatctgct     120
aatgtagcca tagtatcctc ctcatatttc agtataacat aacttttatt tttttaccta     180
tattttacta aaaaaatagt aaaaatattg attttccatg tgaaaggggt tacgatttca     240
gtataaacaa aaagaataag tgagatacat cctatgaata catcacagtt aagagaaaag     300

<210> SEQ ID NO 6
<211> LENGTH: 300
<212> TYPE: DNA
<213> ORGANISM: Streptococcus thermophilus G15

<400> SEQUENCE: 6
tcatcagcga tagttaatat ccgatgtcta gtatcctctg ttacggaaag agtttcatct      60
ttattaagaa cacgtgaaac agttgaaata gatacacctg ctaattttgc gatatctgct     120
aatgtagcca tagtatcctc ctcatatttc agtataacat aacttttatt tttttaccta     180
tattttacta aaaaaatagt aaaaatattg attttccatg tgaaaggtgt tacgatttca     240
gtataaacaa aaagaataag tgagatacat cctatgaata catcacagtt aagagaaaag     300

<210> SEQ ID NO 7
<211> LENGTH: 1902
<212> TYPE: DNA
<213> ORGANISM: Streptococcus thermophilus G15

<400> SEQUENCE: 7
atggattaca aacaaattgc aaaagaagtc atcgaagccc tcggtggacg tgaaaatgtt      60
aacagtgttg ctcactgtgc gacacgtcta cgtgttatgg ttaaagatga aaacaaaatc     120 aataagaaa aagctgagaa tattgaaaaa gttcaaggtg ctttctttaa ctcaggtcaa     180
taccaaatga tctttggtac aggtactgtt aacaagattt cgacgaagt cgttgctcaa     240

-continued

```
ggtcttccaa cagcatctaa agacgaacaa aaagcagaag ctgctaaaca agggaactgg        300
ttccaacgtg ccatccgttc attcggtgac gttttcgttc cattgcttcc agctatcgta        360
gcgactggtc ttttcatggg tatccgtgga gccatcaata atgatacagt tcttgctctt        420
tttggtacaa catctaaagc cttcgctgct actgatttct acacttatac agttgtattg        480
acagatacag cctttgcctt cttcccagcc ttgatctgtt ggtcagcctt aacgttttc         540 ggtggttcac cacttcttgg tttggttctt ggtttgatga tggttaacaa tgctcttcca        600
aatgcttggg atgttgtatc aggtgctgca aaaccaattt acttctttga ctttattcca        660
gtagttggtt accaaaactc agtccttcca gccttcttcg taggtttgat tggtgctaag        720
tttgaacaat gggttcgtaa atgggttcca gatattcttg accttctctt gcgtccactt        780
gttgtctttg ctgtgatgtc agctttggcc ctctttatca ttggtcctgt cttccacaca        840
gttgagagct acgtacttgc tggtacagag tggattcttg ccttgccatt tggtcttgca        900
ggtcttgttc taggtggtat tcaccaaatt atcgtcgtta caggggttca ccacgttttc        960
aacttgcttg aagctaacct tatttctaat acaggtaaag acccacttaa cgctatcatc       1020
acagctgcga tgactgctca agctggtgca acacttgctg ttggtgttaa aactaaagac       1080
tctaagttga aagctctcgc tttccctgca agtctttcag cagtacttgg tatcactgaa       1140
ccagctatct tcggggttaa ccttcgtttc ggtaaaccat ttatcatggg tcttatcgct       1200
ggtgctgctg gtggttggtt ggcatcaatc cttaaccttg ctggtacagg atttggtgta       1260
acaatcgttc ctggtactct tctctaccta aatggtcaag tacttaagta tgtaatcatg       1320
gtacttgtaa cacttgctct tggttttcgct cttacttgga tctttggata taagaggaa       1380 gaggttgaag ctcaaacaga agttgttgct gaagatatcg cctcagcagg ttctgctcca       1440
gttgcattgc aagctgaaac aattgctgca ccacttaaag gtgaagttgt agctttggaa       1500
aatgtaaatg acccagtctt ctcttcagga gctatgggta aggtgccgc tatcaaacct        1560 tcaggtaacc gagttgttgc accatttgat ggtgaagtgc aaattgcctt cccaacaggt       1620
cacgcttacg gtcttaaatc tgataaaggt gctgaagtgc ttatccacat cggtatcgat       1680
actgtctcac ttgacggtaa aggatttgat gctaaggttc aagcaaatca acgtgttaaa       1740
aaaggtgatg tcttggctac cttcgatagc tcagttatca ctgaagcagg tcttgacgat       1800
acaactatgg ttatcgttac aaacactgca gactacgaag atgtttcatc agtagcaact       1860
ggttcagttg ctgagggtga tgacttcatc gcagttaaat aa                          1902
```

<210> SEQ ID NO 8
<211> LENGTH: 1902
<212> TYPE: DNA
<213> ORGANISM: Streptococcus thermophilus clone 11

<400> SEQUENCE: 8

```
atggattaca aacaaattgc aaaagaagtc atcgaagccc tcggtggacg tgaaaatgtt         60
aacagtgttg ctcactgtgc gacacgtcta cgtgttatgg ttaaagatga aaacaaaatc        120
aataaagaaa aagctgagaa tattgaaaaa gttcaaggtg ctttctttaa ctcaggtcaa        180
taccaaatga tctttggtac aggtactgtt aacaagattt acgacgaagt cgttgctcaa        240
ggtcttccaa cagcatctaa agacgaacaa aaagcagaag ctgctaaaca agggaactgg        300
ttccaacgtg ccatccgttc attcggtgac gttttcgttc cattgcttcc agctatcgta        360
gcgactggtc ttttcatggg tatccgtgga gccatcaata atgatacagt tcttgctctt        420
```

```
tttggtacaa catctaaagc cttcgctgct actgatttct acacttatac agttgtattg      480
acagatacag cctttgcctt cttcccagcc ttgatctgtt ggtcagcctt taacgttttc      540
ggtggttcac cacttcttgg tttggttctt ggtttgatga tggttaacaa tgctcttcca      600
aatgcttggg atgttgtatc aggtgctgca aaaccaattt acttctttga ctttattcca      660
gtagttggtt accaaaactc agtccttcca gccttcttcg taggtttgat tggtgctaag      720
tttgaacaat gggttcgtaa atgggttcca gatattcttg accttctctt gcgtccactt      780
gttgtctttg ctgtgatgtc agctttggcc ctctttatca ttggtcctgt cttccacaca      840
gttgagagct acgtacttgc tggtacagag tggattcttg ccttgccatt tggtcttgca      900
ggtcttgttc taggtggtat tcaccaaatt atcgtcgtta caggggttca ccacgttttc      960
aacttgcttg aagctaacct tatttctaat acaggtaaag acccacttaa cgctatcatc     1020
acagctgcga tgactgctca agctggtgca cacttgctg ttggtgttaa aactaaagac      1080
tctaagttga agctctcgc tttccctgca agtctttcag cagtacttgg tatcactgaa      1140
ccagctatct tcggggttaa ccttcgtttc ggtaaaccat ttatcatggg tcttatcgct     1200
ggtgctgctg tggttggtt ggcatcaatc cttaaccttg ctggtacagg atttggtgta      1260
acaatcgttc ctggtactct tctctaccta aatggtcaag tacttaagta tgtaatcatg     1320
gtacttgtaa cacttgctct tggtttcgct cttacttgga tctttggata taaagaggaa     1380
gaggttgaag cttaaacaga agttgttgct gaagatatcg cctcagcagg ttctgctcca     1440
gttgcattgc aagctgaaac aattgctgca ccacttaaag gtgaagttgt agctttggaa     1500
aatgtaaatg acccagtctt ctcttcagga gctatgggta aggtgccgc tatcaaacct      1560
tcaggtaacc gagttgttgc accatttgat ggtgaagtgc aaattgcctt cccaacaggt     1620
cacgcttacg tcttaaaatc tgataaaggt gctgaagtgc ttatccacat cggtatcgat     1680
actgtctcac ttgacggtaa aggatttgat gctaaggttc aagcaaatca acgtgttaaa     1740
aaaggtgatg tcttggctac cttcgatagc tcagttatca ctgaagcagg tcttgacgat     1800
acaactatgg ttatcgttac aaacactgca gactacgaag atgtttcatc agtagcaact     1860
ggttcagttg ctgagggtga tgacttcatc gcagttaaat aa                        1902
```

<210> SEQ ID NO 9
<211> LENGTH: 633
<212> TYPE: PRT
<213> ORGANISM: Streptococcus thermophilus G15

<400> SEQUENCE: 9

Met Asp Tyr Lys Gln Ile Ala Lys Glu Val Ile Glu Ala Leu Gly Gly
1               5                   10                  15

Arg Glu Asn Val Asn Ser Val Ala His Cys Ala Thr Arg Leu Arg Val
            20                  25                  30

Met Val Lys Asp Glu Asn Lys Ile Asn Lys Glu Lys Ala Glu Asn Ile
        35                  40                  45

Glu Lys Val Gln Gly Ala Phe Phe Asn Ser Gly Gln Tyr Gln Met Ile
    50                  55                  60

Phe Gly Thr Gly Thr Val Asn Lys Ile Tyr Asp Glu Val Val Ala Gln
65                  70                  75                  80

Gly Leu Pro Thr Ala Ser Lys Asp Glu Gln Lys Ala Glu Ala Ala Lys
                85                  90                  95

Gln Gly Asn Trp Phe Gln Arg Ala Ile Arg Ser Phe Gly Asp Val Phe
            100                 105                 110

```
Val Pro Leu Leu Pro Ala Ile Val Ala Thr Gly Leu Phe Met Gly Ile
            115                 120                 125

Arg Gly Ala Ile Asn Asn Asp Thr Val Leu Ala Leu Phe Gly Thr Thr
130                 135                 140

Ser Lys Ala Phe Ala Ala Thr Asp Phe Tyr Thr Tyr Thr Val Val Leu
145                 150                 155                 160

Thr Asp Thr Ala Phe Ala Phe Phe Pro Ala Leu Ile Cys Trp Ser Ala
                165                 170                 175

Phe Asn Val Phe Gly Gly Ser Pro Leu Leu Gly Leu Val Leu Gly Leu
            180                 185                 190

Met Met Val Asn Asn Ala Leu Pro Asn Ala Trp Asp Val Val Ser Gly
        195                 200                 205

Ala Ala Lys Pro Ile Tyr Phe Phe Asp Phe Ile Pro Val Val Gly Tyr
    210                 215                 220

Gln Asn Ser Val Leu Pro Ala Phe Phe Val Gly Leu Ile Gly Ala Lys
225                 230                 235                 240

Phe Glu Gln Trp Val Arg Lys Trp Val Pro Asp Ile Leu Asp Leu Leu
                245                 250                 255

Leu Arg Pro Leu Val Val Phe Ala Val Met Ser Ala Leu Ala Leu Phe
            260                 265                 270

Ile Ile Gly Pro Val Phe His Thr Val Glu Ser Tyr Val Leu Ala Gly
        275                 280                 285

Thr Glu Trp Ile Leu Ala Leu Pro Phe Gly Leu Ala Gly Leu Val Leu
    290                 295                 300

Gly Gly Ile His Gln Ile Val Val Thr Gly Val His His Val Phe
305                 310                 315                 320

Asn Leu Leu Glu Ala Asn Leu Ile Ser Asn Thr Gly Lys Asp Pro Leu
                325                 330                 335

Asn Ala Ile Ile Thr Ala Ala Met Thr Ala Gln Ala Gly Ala Thr Leu
            340                 345                 350

Ala Val Gly Val Lys Thr Lys Asp Ser Lys Leu Lys Ala Leu Ala Phe
        355                 360                 365

Pro Ala Ser Leu Ser Ala Val Leu Gly Ile Thr Glu Pro Ala Ile Phe
    370                 375                 380

Gly Val Asn Leu Arg Phe Gly Lys Pro Phe Ile Met Gly Leu Ile Ala
385                 390                 395                 400

Gly Ala Ala Gly Gly Trp Leu Ala Ser Ile Leu Asn Leu Ala Gly Thr
                405                 410                 415

Gly Phe Gly Val Thr Ile Val Pro Gly Thr Leu Leu Tyr Leu Asn Gly
            420                 425                 430

Gln Val Leu Lys Tyr Val Ile Met Val Leu Val Thr Leu Ala Leu Gly
        435                 440                 445

Phe Ala Leu Thr Trp Ile Phe Gly Tyr Lys Glu Glu Val Glu Ala
    450                 455                 460

Gln Thr Glu Val Val Ala Glu Asp Ile Ala Ser Ala Gly Ser Ala Pro
465                 470                 475                 480

Val Ala Leu Gln Ala Glu Thr Ile Ala Ala Pro Leu Lys Gly Glu Val
                485                 490                 495

Val Ala Leu Glu Asn Val Asn Asp Pro Val Phe Ser Ser Gly Ala Met
            500                 505                 510

Gly Lys Gly Ala Ala Ile Lys Pro Ser Gly Asn Arg Val Val Ala Pro
        515                 520                 525

Phe Asp Gly Glu Val Gln Ile Ala Phe Pro Thr Gly His Ala Tyr Gly
```

```
                     530                 535                 540
Leu Lys Ser Asp Lys Gly Ala Glu Val Leu Ile His Ile Gly Ile Asp
545                 550                 555                 560

Thr Val Ser Leu Asp Gly Lys Gly Phe Asp Ala Lys Val Gln Ala Asn
                565                 570                 575

Gln Arg Val Lys Lys Gly Asp Val Leu Ala Thr Phe Asp Ser Ser Val
            580                 585                 590

Ile Thr Glu Ala Gly Leu Asp Asp Thr Thr Met Val Ile Val Thr Asn
        595                 600                 605

Thr Ala Asp Tyr Glu Asp Val Ser Ser Val Ala Thr Gly Ser Val Ala
    610                 615                 620

Glu Gly Asp Asp Phe Ile Ala Val Lys
625                 630

<210> SEQ ID NO 10
<211> LENGTH: 464
<212> TYPE: PRT
<213> ORGANISM: Streptococcus thermophilus clone 11

<400> SEQUENCE: 10

Met Asp Tyr Lys Gln Ile Ala Lys Glu Val Ile Glu Ala Leu Gly Gly
1               5                   10                  15

Arg Glu Asn Val Asn Ser Val Ala His Cys Ala Thr Arg Leu Arg Val
            20                  25                  30

Met Val Lys Asp Glu Asn Lys Ile Asn Lys Glu Lys Ala Glu Asn Ile
        35                  40                  45

Glu Lys Val Gln Gly Ala Phe Phe Asn Ser Gly Gln Tyr Gln Met Ile
    50                  55                  60

Phe Gly Thr Gly Thr Val Asn Lys Ile Tyr Asp Glu Val Val Ala Gln
65                  70                  75                  80

Gly Leu Pro Thr Ala Ser Lys Asp Glu Gln Lys Ala Glu Ala Ala Lys
                85                  90                  95

Gln Gly Asn Trp Phe Gln Arg Ala Ile Arg Ser Phe Gly Asp Val Phe
            100                 105                 110

Val Pro Leu Leu Pro Ala Ile Val Ala Thr Gly Leu Phe Met Gly Ile
        115                 120                 125

Arg Gly Ala Ile Asn Asn Asp Thr Val Leu Ala Leu Phe Gly Thr Thr
    130                 135                 140

Ser Lys Ala Phe Ala Ala Thr Asp Phe Tyr Thr Tyr Thr Val Val Leu
145                 150                 155                 160

Thr Asp Thr Ala Phe Ala Phe Phe Pro Ala Leu Ile Cys Trp Ser Ala
                165                 170                 175

Phe Asn Val Phe Gly Gly Ser Pro Leu Leu Gly Leu Val Leu Gly Leu
            180                 185                 190

Met Met Val Asn Asn Ala Leu Pro Asn Ala Trp Asp Val Val Ser Gly
        195                 200                 205

Ala Ala Lys Pro Ile Tyr Phe Phe Asp Phe Ile Pro Val Val Gly Tyr
    210                 215                 220

Gln Asn Ser Val Leu Pro Ala Phe Phe Val Gly Leu Ile Gly Ala Lys
225                 230                 235                 240

Phe Glu Gln Trp Val Arg Lys Trp Val Pro Asp Ile Leu Asp Leu Leu
                245                 250                 255

Leu Arg Pro Leu Val Val Phe Ala Val Met Ser Ala Leu Ala Leu Phe
            260                 265                 270
```

```
Ile Ile Gly Pro Val Phe His Thr Val Glu Ser Tyr Val Leu Ala Gly
            275                 280                 285

Thr Glu Trp Ile Leu Ala Leu Pro Phe Gly Leu Ala Gly Leu Val Leu
        290                 295                 300

Gly Gly Ile His Gln Ile Ile Val Val Thr Gly Val His His Val Phe
305                 310                 315                 320

Asn Leu Leu Glu Ala Asn Leu Ile Ser Asn Thr Gly Lys Asp Pro Leu
                325                 330                 335

Asn Ala Ile Ile Thr Ala Ala Met Thr Ala Gln Ala Gly Ala Thr Leu
            340                 345                 350

Ala Val Gly Val Lys Thr Lys Asp Ser Lys Leu Lys Ala Leu Ala Phe
        355                 360                 365

Pro Ala Ser Leu Ser Ala Val Leu Gly Ile Thr Glu Pro Ala Ile Phe
    370                 375                 380

Gly Val Asn Leu Arg Phe Gly Lys Pro Phe Ile Met Gly Leu Ile Ala
385                 390                 395                 400

Gly Ala Ala Gly Gly Trp Leu Ala Ser Ile Leu Asn Leu Ala Gly Thr
                405                 410                 415

Gly Phe Gly Val Thr Ile Val Pro Gly Thr Leu Leu Tyr Leu Asn Gly
            420                 425                 430

Gln Val Leu Lys Tyr Val Ile Met Val Leu Val Thr Leu Ala Leu Gly
        435                 440                 445

Phe Ala Leu Thr Trp Ile Phe Gly Tyr Lys Glu Glu Glu Val Glu Ala
    450                 455                 460

<210> SEQ ID NO 11
<211> LENGTH: 996
<212> TYPE: DNA
<213> ORGANISM: Streptococcus thermophilus clone 11

<400> SEQUENCE: 11
atggctacat tagcagatat cgcaaaatta gcaggtgtat ctatttcaac tgtttcacgt      60
gttcttaata agatgaaac tctttccgta acagaggata ctagacatcg atattaact     120 atcgctgatg aaatcggata tactaaatac aaaacaatta ataattcaaa aaagaaaag     180 tatcaagtgg caattattca atgggttagt gaagaacacg agttagatga catctactat     240
tataatatta gacttggtat tgaaaaaaga gcctatgaac tagactacga gatgcttcac     300 ttttcaacg acattccttc aagtctagga gaggaggtcg ttggtgtact atgtatcgga     360
aaatttagtc gtgaacaaat tgcgaaacta gaaagactaa aaaagactct ggtctttgtt     420
gatagtgata ctcttaatca aggacatcca tgtgttacta ctgattttga aaactccgta     480
caatcggcac tctgttatct aaagaacaa ggttgtaata atataggcct actcattggg     540
caagaaaaaa caacagatgc aactgaaatc atttctgatc ctcgtttacg ttcttatcga     600
aactactgta tggaaaaggg aatctatgac cctcttttta ttctgactgg tgacttcact     660
gtccaatctg gctatgaact tcttgattct aagattaaga gtggagctac tttacctgat     720
gcttactttg cggctagtga tagtctagct attggtgcac tcagagcact tcaggaaaat     780
ggtatcaagg tccctgacga cattcaaatt atctcttttta acgatacaac tctagctaaa     840
caagtgtatc ctccactttc tagtgtcact gtctatacag aagaaatggg acgaacagct     900
atggatattc tcaataaaca attattagca cctcgaaaaa taccaacact tactaaacta     960
ggaacaaaat taacattaag aaacagtaca aaatag                              996
```

<210> SEQ ID NO 12
<211> LENGTH: 996
<212> TYPE: DNA
<213> ORGANISM: Streptococcus thermophilus clone 11R15

<400> SEQUENCE: 12

```
atggctacat tagcagatat cgcaaaatta gcaggtgtat ctatttcaac tgtttcacgt      60
gttcttaata agatgaaac tctttccgta acagaggata ctagacatcg gatattaact     120
atcgctgatg aaatcggata tactaaatac aaaacaatta taattccaaa aaagaaaag    180
tatcaagtgg caattattca atgggttagt gaagaacacg agttagatga catctactat     240
tataatatta gacttggtat tgaaaaaaga gcctatgaac cagactacga gatgcttcac     300
tttttcaacg acattccttc aagtctagga gaggaggtcg ttggtgtact atgtatcgga     360
aaatttagtc gtgaacaaat tgcgaaacta gaaagactaa aaagactct ggtctttgtt      420
gatagtgata ctcttaatca aggacatcca tgtgttacta ctgattttga aaactccgta     480
caatcggcac tctgttatct aaagaacaa ggttgtaata atataggcct actcattggg     540
caagaaaaaa caacagatgc aactgaaatc atttctgatc ctcgtttacg ttcttatcga     600
aactactgta tggaaaaggg aatctatgac cctcttttta ttctgactgg tgacttcact     660
gtccaatctg gctatgaact tcttgattct aagattaaga gtggagctac tttacctgat     720
gcttactttg cggctagtga tagtctagct attggtgcac tcagagcact tcaggaaaat     780
ggtatcaagg tccctgacga cattcaaatt atctctttta cgatacaac tctagctaaa     840
caagtgtatc ctccactttc tagtgtcact gtctatacag aagaaatggg acgaacagct     900
atggatattc tcaataaaca attattagca cctcgaaaaa taccaacact tactaaacta     960
ggaacaaaat taacattaag aaacagtaca aaatag                             996
```

<210> SEQ ID NO 13
<211> LENGTH: 331
<212> TYPE: PRT
<213> ORGANISM: Streptococcus thermophilus clone 11

<400> SEQUENCE: 13

```
Met Ala Thr Leu Ala Asp Ile Ala Lys Leu Ala Gly Val Ser Ile Ser
1               5                   10                  15

Thr Val Ser Arg Val Leu Asn Lys Asp Glu Thr Leu Ser Val Thr Glu
            20                  25                  30

Asp Thr Arg His Arg Ile Leu Thr Ile Ala Asp Glu Ile Gly Tyr Thr
        35                  40                  45

Lys Tyr Lys Thr Ile Asn Asn Ser Lys Lys Glu Lys Tyr Gln Val Ala
    50                  55                  60

Ile Ile Gln Trp Val Ser Glu Glu His Glu Leu Asp Asp Ile Tyr Tyr
65                  70                  75                  80

Tyr Asn Ile Arg Leu Gly Ile Glu Lys Arg Ala Tyr Glu Leu Asp Tyr
                85                  90                  95

Glu Met Leu His Phe Phe Asn Asp Ile Pro Ser Ser Leu Gly Glu Glu
            100                 105                 110

Val Val Gly Val Leu Cys Ile Gly Lys Phe Ser Arg Glu Gln Ile Ala
        115                 120                 125

Lys Leu Glu Arg Leu Lys Lys Thr Leu Val Phe Val Asp Ser Asp Thr
    130                 135                 140

Leu Asn Gln Gly His Pro Cys Val Thr Thr Asp Phe Glu Asn Ser Val
145                 150                 155                 160
```

```
Gln Ser Ala Leu Cys Tyr Leu Lys Glu Gln Gly Cys Asn Asn Ile Gly
                165                 170                 175

Leu Leu Ile Gly Gln Glu Lys Thr Thr Asp Ala Thr Glu Ile Ile Ser
            180                 185                 190

Asp Pro Arg Leu Arg Ser Tyr Arg Asn Tyr Cys Met Glu Lys Gly Ile
        195                 200                 205

Tyr Asp Pro Leu Phe Ile Leu Thr Gly Asp Phe Thr Val Gln Ser Gly
    210                 215                 220

Tyr Glu Leu Leu Asp Ser Lys Ile Lys Ser Gly Ala Thr Leu Pro Asp
225                 230                 235                 240

Ala Tyr Phe Ala Ala Ser Asp Ser Leu Ala Ile Gly Ala Leu Arg Ala
                245                 250                 255

Leu Gln Glu Asn Gly Ile Lys Val Pro Asp Ile Gln Ile Ile Ser
            260                 265                 270

Phe Asn Asp Thr Thr Leu Ala Lys Gln Val Tyr Pro Pro Leu Ser Ser
        275                 280                 285

Val Thr Val Tyr Thr Glu Met Gly Arg Thr Ala Met Asp Ile Leu
    290                 295                 300

Asn Lys Gln Leu Leu Ala Pro Arg Lys Ile Pro Thr Leu Thr Lys Leu
305                 310                 315                 320

Gly Thr Lys Leu Thr Leu Arg Asn Ser Thr Lys
                325                 330

<210> SEQ ID NO 14
<211> LENGTH: 331
<212> TYPE: PRT
<213> ORGANISM: Streptococcus thermophilus clone 11R15

<400> SEQUENCE: 14

Met Ala Thr Leu Ala Asp Ile Ala Lys Leu Ala Gly Val Ser Ile Ser
1               5                   10                  15

Thr Val Ser Arg Val Leu Asn Lys Asp Glu Thr Leu Ser Val Thr Glu
            20                  25                  30

Asp Thr Arg His Arg Ile Leu Thr Ile Ala Asp Glu Ile Gly Tyr Thr
        35                  40                  45

Lys Tyr Lys Thr Ile Asn Asn Ser Lys Lys Glu Lys Tyr Gln Val Ala
    50                  55                  60

Ile Ile Gln Trp Val Ser Glu Glu His Glu Leu Asp Asp Ile Tyr Tyr
65                  70                  75                  80

Tyr Asn Ile Arg Leu Gly Ile Glu Lys Arg Ala Tyr Glu Pro Asp Tyr
                85                  90                  95

Glu Met Leu His Phe Phe Asn Asp Ile Pro Ser Ser Leu Gly Glu Glu
            100                 105                 110

Val Val Gly Val Leu Cys Ile Gly Lys Phe Ser Arg Glu Gln Ile Ala
        115                 120                 125

Lys Leu Glu Arg Leu Lys Lys Thr Leu Val Phe Val Asp Ser Asp Thr
    130                 135                 140

Leu Asn Gln Gly His Pro Cys Val Thr Thr Asp Phe Glu Asn Ser Val
145                 150                 155                 160

Gln Ser Ala Leu Cys Tyr Leu Lys Glu Gln Gly Cys Asn Asn Ile Gly
                165                 170                 175

Leu Leu Ile Gly Gln Glu Lys Thr Thr Asp Ala Thr Glu Ile Ile Ser
            180                 185                 190

Asp Pro Arg Leu Arg Ser Tyr Arg Asn Tyr Cys Met Glu Lys Gly Ile
        195                 200                 205
```

-continued

```
Tyr Asp Pro Leu Phe Ile Leu Thr Gly Asp Phe Thr Val Gln Ser Gly
    210                 215                 220

Tyr Glu Leu Leu Asp Ser Lys Ile Lys Ser Gly Ala Thr Leu Pro Asp
225                 230                 235                 240

Ala Tyr Phe Ala Ala Ser Asp Ser Leu Ala Ile Gly Ala Leu Arg Ala
                245                 250                 255

Leu Gln Glu Asn Gly Ile Lys Val Pro Asp Asp Ile Gln Ile Ile Ser
            260                 265                 270

Phe Asn Asp Thr Thr Leu Ala Lys Gln Val Tyr Pro Pro Leu Ser Ser
        275                 280                 285

Val Thr Val Tyr Thr Glu Glu Met Gly Arg Thr Ala Met Asp Ile Leu
    290                 295                 300

Asn Lys Gln Leu Leu Ala Pro Arg Lys Ile Pro Thr Leu Thr Lys Leu
305                 310                 315                 320

Gly Thr Lys Leu Thr Leu Arg Asn Ser Thr Lys
                325                 330

<210> SEQ ID NO 15
<211> LENGTH: 14
<212> TYPE: DNA
<213> ORGANISM: Streptococcus thermophilus

<400> SEQUENCE: 15
tgaaaggggt tacg                                                    14
```